(12) United States Patent
Sharma et al.

(10) Patent No.: US 11,774,925 B2
(45) Date of Patent: Oct. 3, 2023

(54) BUILDING MANAGEMENT SYSTEM WITH DEVICE TWINNING, COMMUNICATION CONNECTION VALIDATION, AND BLOCK CHAIN

(71) Applicant: Johnson Controls Tyco IP Holdings LLP, Milwaukee, WI (US)

(72) Inventors: Vikas Sharma, New Delhi (IN); Sudhanshu Dixit, Milwaukee, WI (US); Ankur Thareja, Alwar (IN); Rajesh Nayak, Manipal (IN); Harpreet Singh Virdi, New Delhi (IN); Anil Kumar, Delhi (IN); Rajeev T. Singh, New Berlin, WI (US)

(73) Assignee: JOHNSON CONTROLS TYCO IP HOLDINGS LLP, Milwaukee, WI (US)

( * ) Notice: Subject to any disclaimer, the term of this patent is extended or adjusted under 35 U.S.C. 154(b) by 475 days.

(21) Appl. No.: 16/673,738

(22) Filed: Nov. 4, 2019

(65) Prior Publication Data
US 2020/0142365 A1 May 7, 2020

Related U.S. Application Data

(60) Provisional application No. 62/755,918, filed on Nov. 5, 2018.

(51) Int. Cl.
*G05B 13/04* (2006.01)
*G05B 23/02* (2006.01)
(Continued)

(52) U.S. Cl.
CPC ....... *G05B 13/048* (2013.01); *G05B 23/0283* (2013.01); *G06F 40/30* (2020.01); *G06N 7/01* (2023.01)

(58) Field of Classification Search
None
See application file for complete search history.

(56) References Cited

U.S. PATENT DOCUMENTS 5,968,263 A * 10/1999 Grover .................... C30B 15/14
117/14
6,209,794 B1 * 4/2001 Webster .................. G06F 30/15
236/94

(Continued)

OTHER PUBLICATIONS https://docs.microsoft.com/en-us/azure/machine-learning/studio-module-reference/evaluate-model.
https://docs.microsoft.com/en-us/azure/machine-learning/studio-module-reference/score-model.
Understand and Use Device Twins in IoT Hub.

*Primary Examiner* — Bernard G Lindsay
(74) *Attorney, Agent, or Firm* — Foley & Lardner LLP

(57) ABSTRACT

A building management system includes one or more processing circuits. The one or more processing circuits are configured to receive, from a physical building device of a building, environmental inputs and environmental outputs of the physical building device; generate a building device digital twin for the physical building device based on the received environmental inputs and the received environmental outputs; generate a predicted future performance of the physical building device based on the building device digital twin; and generate a recommendation based on the predicted future performance of the physical building device, the recommendation indicating one or more changes to implement on the physical building device. The building device digital twin is a model for predicting the behavior of the physical building device ore changes to implement on the physical building device.

20 Claims, 24 Drawing Sheets

(51) Int. Cl.
*G06F 40/30* (2020.01)
*G06N 7/01* (2023.01)

(56) References Cited

U.S. PATENT DOCUMENTS

| | | | |
|---|---|---|---|
| 10,360,304 B1* | 7/2019 | Alvarez | G06F 40/205 |
| 2003/0109951 A1* | 6/2003 | Hsiung | G05B 15/02 |
| | | | 700/96 |
| 2006/0212175 A1* | 9/2006 | Kim | H04L 12/66 |
| | | | 700/277 |
| 2012/0259594 A1* | 10/2012 | Khan | G06T 13/60 |
| | | | 703/1 |
| 2017/0314800 A1* | 11/2017 | Bengea | F24F 11/62 |
| 2017/0361259 A1* | 12/2017 | Fox | B01D 46/0086 |
| 2018/0143047 A1* | 5/2018 | Gal | G06Q 20/145 |
| 2018/0189667 A1* | 7/2018 | Tsou | G06N 5/003 |
| 2018/0328612 A1 | 11/2018 | Sinha et al. | |
| 2019/0278242 A1* | 9/2019 | Gervais | G05B 13/029 |
| 2019/0361921 A1* | 11/2019 | Benndorf | G06N 20/20 |
| 2020/0125401 A1* | 4/2020 | Poluri | G06F 9/4881 |
| 2021/0357928 A1* | 11/2021 | Matsunaga | H04L 9/3247 |
| 2021/0365948 A1* | 11/2021 | Briscombe | G06Q 20/4016 |
| 2021/0373521 A1* | 12/2021 | Jetzfellner | G06F 16/27 |

* cited by examiner

Request format

```
{
  "Inputs": {
    "input1": {
      "ColumnNames":
      [
        "Hour",
        "OAT",
        "RAT"
      ],
      "Values": [
        [
          "10",
          "75.5",
          "0"
        ]
      ]
    },
    "GlobalParameters": {}
  }
}
```

Reply format

```
{
  "Results": {
    "output1": {
      "type": "DataTable",
      "value": {
        "ColumnNames": [
          "Hour",
          "OAT",
          "RAT",
          "Scored Label Mean",
          "Scored Label Standard Deviation"
        ],
        "ColumnTypes": [
          "Numeric",
          "Numeric",
          "Numeric",
          "Numeric",
          "Numeric"
        ],
        "Values": [
          [
            "10",
            "75.5",
            "0",
            "76.708",
            "0.118"
          ]
        ]
      }
    }
  }
}
```

BUILDING MANAGEMENT SYSTEM WITH DEVICE TWINNING, COMMUNICATION CONNECTION VALIDATION, AND BLOCK CHAIN

CROSS-REFERENCE TO RELATED PATENT APPLICATIONS

The present application claims priority to and the benefit of U.S. Provisional Application No. 62/755,918, filed Nov. 5, 2018, which is incorporated herein by reference in its entirety.

BACKGROUND

The present disclosure relates generally to building management systems (BMS). The present disclosure relates more particularly to building managements systems with digital device twinning, and secured communications using block chain. A building management system (BMS) is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

Almost every customer site has experienced the inconvenience and discomfort of unplanned downtime of a BMS system. When these BMS systems are down, generally, a field technician is required to physically visit the customer site in order to identify and fix the problem, which can take anywhere from a few minutes to a few days depending on the issue. In some cases, the unplanned downtime could have been avoided with proper maintenance and/or early detection of potential equipment faults. However, in many cases, the controllers and devices of a BMS system lack data intelligence that can, for example, detect the ageing effects of the equipment, because controllers and various devices of a BMS have traditionally included low computational power and low storage capacity.

Recently, a variety of technologies and solutions have been developed with immense computational power and high storage capacity. However, because many of the controllers and devices having low computational power and low storage capacity are already installed or otherwise implemented at customer sites, it may be impractical to replace those controllers or devices with newer devices. In addition, these devices generally lack a concrete solution for device or data transaction security, and thus, are at risk from unauthorized access by third parties.

The above information disclosed in this Background section is for enhancement of understanding of the background of the invention, and therefore, it may contain information that does not constitute prior art.

SUMMARY

One implementation of the present disclosure is a building management system (BMS) including one or more processing circuits. The one or more processing circuits are configured to receive, from a physical building device of a building, environmental inputs and environmental outputs of the physical building device; generate a building device digital twin for the physical building device based on the received environmental inputs and the received environmental outputs; generate a predicted future performance of the physical building device based on the building device digital twin; and generate a recommendation based on the predicted future performance of the physical building device, the recommendation indicating one or more changes to implement on the physical building device. The building device digital twin is a model for predicting the behavior of the physical building device.

In some embodiments, the one or more processing circuits are configured to receive a natural language input from a user of a user device including a request for generation of analytics for the physical building device, perform natural language processing to determine the request for the generation of analytics for the physical building device, and generate the recommendation in response to determining the request for the generation of analytics.

In some embodiments, the one or more processing circuits are configured to present, via a user interface of a user device, the recommendation. The recommendation includes at least one of an indication to schedule preventative maintenance for the physical building device, an indication to adjust an operating parameter of the physical building device, or an indication of an adjustment to make to a future design of the physical building device.

In some embodiments, the one or more processing circuits are configured to generate an operating parameter update for an operating parameter of the physical building device and control, via the physical building device, an environmental condition of the building based on the operating parameter update.

In some embodiments, the one or more processing circuits are configured to store initial network configuration parameters associated with a network in a private block chain, the network configured to communicate with the physical building device; determine current network configuration parameters; determine whether the network has been compromised by comparing the current network configuration parameters to the initial network configuration parameters; and transmit the parameter update to the physical building device in response to a determination that the network has not been compromised. A match between the current network configuration parameters and the initial network configuration parameters indicates that the network has not been compromised.

In some embodiments, the one or more processing circuits are configured to generate the building device digital twin for the physical building device based on the received environmental inputs and the received environmental outputs by generating a decision forest regression model; generating a training data set and a scoring data set by dividing the environmental inputs and the environmental outputs into the training data set and the scoring data set; training the decision forest regression model based on the training set; and generating a performance metric for the decision forest regression model by evaluating the decision forest regression model based on the scoring data set. The trained decision forest regression model is the building device digital twin.

In some embodiments, the one or more processing circuits are configured to generate the predicted future performance of the physical building device based on the building device digital twin by receiving current environmental inputs from the physical building device and generating simulated environmental outputs based on the building device digital twin and the received current environmental inputs. The current environmental inputs are recorded by the physical building device after the environmental inputs.

In some embodiments, the one or more processing circuits are configured to receive real-time environmental inputs from the physical building device, generate a three dimensional view of the building and the physical building device, and present, via a user interface of a user device, the three dimensional view of the building and the physical building device, and an indication of the received real-time environmental inputs.

Another implementation of the present disclosure is a method. The method includes receiving, from a physical building device of a building, environmental inputs and environmental outputs of the physical building device; generating a building device digital twin for the physical building device based on the received environmental inputs and the received environmental outputs; generating a predicted future performance of the physical building device based on the building device digital twin; and generating a recommendation based on the predicted future performance of the physical building device, the recommendation indicating one or more changes to implement on the physical building device. The building device digital twin is a model for predicting the behavior of the physical building device.

In some embodiments, the method further includes receiving a natural language input from a user device including a request for generation of analytics for the physical building device, performing natural language processing to determine the request for the generation of analytics for the physical building device, and generating the recommendation in response to determining the request for the generation of analytics.

In some embodiments, the method further includes presenting, via a user interface of a user device, the recommendation. The recommendation includes at least one of an indication to schedule preventative maintenance for the physical building device, an indication to adjust an operating parameter of the physical building device, or an indication of an adjustment to make to a future design of the physical building device.

In some embodiments, the method further includes generating an operating parameter update for an operating parameter of the physical building device and controlling, via the physical building device, an environmental condition of the building based on the operating parameter update.

In some embodiments, the method further includes storing initial network configuration parameters associated with a network in a private block chain, the network configured to communicate with the physical building device; determining current network configuration parameters; determining whether the network has been compromised by comparing the current network configuration parameters to the initial network configuration parameters; and transmitting the parameter update to the physical building device in response to a determination that the network has not been compromised. A match between the current network configuration parameters and the initial network configuration parameters indicates that the network has not been compromised.

In some embodiments, the method further includes generating the building device digital twin for the physical building device based on the received environmental inputs and the received environmental outputs by generating a decision forest regression model; generating a training data set and a scoring data set by dividing the environmental inputs and the environmental outputs into the training data set and the scoring data set; training the decision forest regression model based on the training set; and generating a performance metric for the decision forest regression model by evaluating the decision forest regression model based on the scoring data set. The trained decision forest regression model is the building device digital twin.

In some embodiments, the method further includes generating the predicted future performance of the physical building device based on the building device digital twin by receiving current environmental inputs from the physical building device and generating simulated environmental outputs based on the building device digital twin and the received current environmental inputs. The current environmental inputs are recorded by the physical building device after the environmental inputs.

In some embodiments, the method further includes receiving real-time environmental inputs from the physical building device, generating a three dimensional view of the building and the physical building device, and presenting, via a user interface of a user device, the three dimensional view of the building and the physical building device, and an indication of the received real-time environmental inputs.

Another implementation of the present disclosure is a building management system (BMS) including one or more processing circuits. The one or more processing circuits are configured to generate one or more building device digital twins for one or more physical building devices; present, via a user interface of a user device, the one or more building device digital twins; receive, via the user interface, a first user input comprising a selection of one of the one or more building device digital twins; receive, via the user interface, a second user input comprising a control command for the selected one of the one or more building device digital twins; and control the one or more physical building devices based on the control command. The one or more building device digital twins are digital representations of the one or more physical building devices and the one or more building device digital twins include real-time or near real-time operational information associated with the one or more physical building devices.

In some embodiments, the one or more processing circuits are configured to receive, via the user interface, a request for a parameter prediction of a physical building device represented by the selected one of the one or more building device digital twins; generate the parameter prediction based on the selected one of the one or more building device digital twins; and present, via the user interface, the parameter prediction.

In some embodiments, the one or more processing circuits are configured to store initial network configuration parameters associated with a network in a private block chain, the network configured to communicate with the physical building device; determine current network configuration parameters; determine whether the network has been compromised by comparing the current network configuration parameters to the initial network configuration parameters; and prevent control of the one or more physical building devices based on a determination that the network has been compromised. A match between the current network configuration parameters and the initial network configuration parameters indicates that the network has not been compromised.

In some embodiments, the one or more processing circuits are configured to generate the one or more building device digital twins by generating a decision forest regression model; generating a training data set and a scoring data set based on environmental inputs and environmental outputs of the one or more physical building devices associated with the one or more building device digital twins; training the decision forest regression model based on the training data set; and generating a performance metric for the decision forest regression model by evaluating the decision forest regression model based on the scoring data set. The trained decision forest regression model is the one or more building device digital twins.

BRIEF DESCRIPTION OF THE DRAWINGS

Various objects, aspects, features, and advantages of the disclosure will become more apparent and better understood by referring to the detailed description taken in conjunction with the accompanying drawing, in which like reference characters identify corresponding elements throughout. In the drawings, like reference numbers generally indicate identical, functionally similar, and/or structurally similar elements.

FIG. 18A is an example web service input, according to some embodiments.

FIG. 18B is an example web service output, according to some embodiments.

DETAILED DESCRIPTION

Overview

Figure 1:
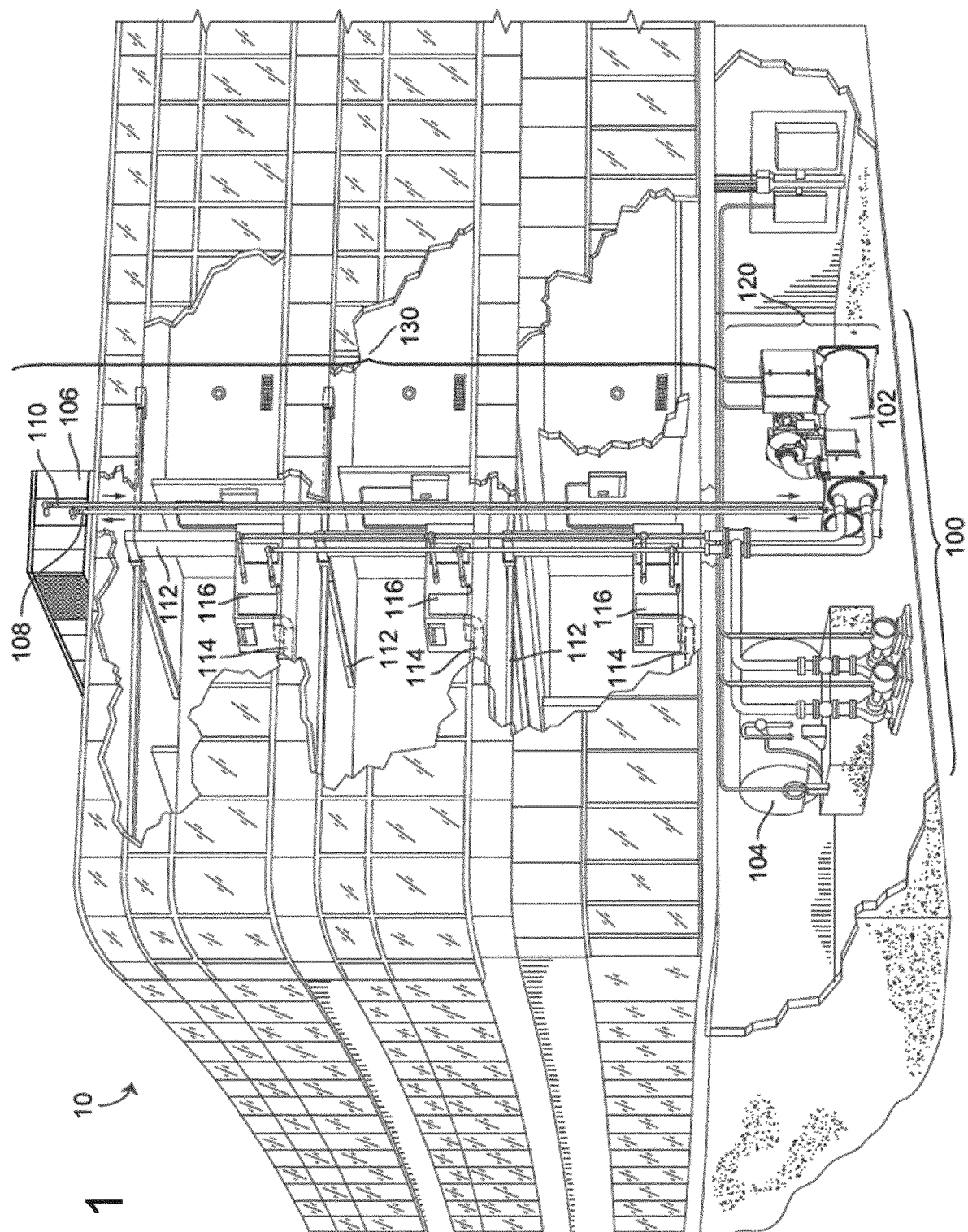
FIG. 1 is a drawing of a building equipped with a HVAC system, according to some embodiments.

Referring generally to the FIGURES, the systems and methods discussed herein relate to a building management system (BMS) that includes device twins (also referred to as digital twin or digital device twin) that modes equipment of a building, according to various exemplary embodiments. For example, an air handler unit (AHU) or chiller is a physical device that can operate based on instructions received from a controller. A digital twin of the physical device can be generated and maintained based on the operation of the physical device. The digital twin may rely on sensor data gathered from the physical device to facilitate an understanding of the current status of the physical device. The sensor data can be collected in real time or otherwise can be recorded and provided to a platform maintaining the digital twin. Based on the received data, the platform maintaining the digital twin can learn from the data over the time, and can provide various operational recommendations for the physical device. These operational recommendations may be used for improvements to the operation of the physical device.

A digital device twin can be an evolving digital profile of the historical and current behavior of a physical device or process that helps optimize business performance. The digital device twin can be based on herculean, cumulative, and real-time data measurements across an assemblage of dimensions. These measurements may be responsible for creating the evolving profile of the physical device or process and provide users with important insights into system performance.

Generally, building equipment and their controllers may have low computing power and storage. Further, it may be impractical to replace building equipment and/or their controllers with new controllers that have a level of computing power desired or required to perform deep data analytics. Instead, the building equipment and their controllers may have computing power that is amenable for performing control algorithms, not for performing deep data analysis. Furthermore, the building equipment and their controllers may lack a concrete solution for data transaction security (e.g., transmitted data may be at risk of being tampered with by a third party).

Building occupants can experience discomfort when building systems experience unexpected downtime. The downtime can be on the order of minutes or even days or weeks. Unexpected system downtime can occur because there is no mechanism that can identify the ageing effects of the building systems. Accordingly, a system and method is desired that can identify life cycle information for building equipment, which can help to identify unexpected downtime that can occur from faults or otherwise breakdowns.

The systems and methods described herein solve the above defined problems by developing and securing digital device twins in a cloud platform (e.g., MICROSFT AZURE, AMAZON WEB SERVICES (AWS), a private cloud, a public cloud, etc.). Representing physical equipment via virtual equipment can improve deep data analytics and real-time data processing. This adds intelligence to equipment without having to expand the hardware or software capabilities of building equipment. Virtual twinning of devices facilitates performance predictions, operational adjustment recommendations, and provides metrics identifying the performance of the equipment. The systems and methods described herein allow technicians and other users to monitor the gaining process of a building's physical equipment.

In some embodiments, the systems and methods described herein may utilize block chain technology with the digital twins. For example, the data of the digital device twin on the cloud platform can be protected via block chain. Having unsecured data storage that a hacker can tamper with risks data breaches.

In some embodiments, the digital twinning systems as described herein can facilitate remote configuration and maintenance of physical building devices. For example, a user or technician could make one or more changes to the digital twin which could be then be implemented as physical operational changes to the physical device. This can save money by reducing service charges which may be required for a technician to be physically present at a building site to make changes to physical devices. Furthermore, the digital twin can be used for auto provisioning of devices. For example, if there is one chiller in a building and a second chiller is installed, the second chiller can receive configuration information based on the digital twin for the first chiller.

Furthermore, in some embodiments, the digital twin can provide continuous (or periodic) monitoring of the health of the physical building equipment. The digital twin can be continually updated based on sensor data collected from the physical devices. Based on the digital twin, device failures can be predicted and maintenance can be recommended for physical devices before a failure occurs. This can improve the total life time of the physical devices. Furthermore, various parameters and settings of the physical devices can continually be tuned based on the digital twins. This can result in more optimal comfort and/or energy usage by the physical device.

Internet of Things Enabled Building Automation and HVAC System

Referring now to FIGS. 1-4, an exemplary building automation system (BAS) and HVAC system in which the systems and methods of the present invention can be implemented are shown, according to an exemplary embodiment. Referring particularly to FIG. 1, a perspective view of a building 10 is shown. Building 10 is served by a BAS. A BAS is, in general, a system of devices configured to control, monitor, and manage equipment in or around a building or building area. A BAS can include, for example, a HVAC system, a security system, a lighting system, a fire alarming system, any other system that is capable of managing building functions or devices, or any combination thereof.

The BAS that serves building 10 includes an HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 can provide a heated or chilled fluid to an air handling unit of airside system 130. Airside system 130 can use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 can transfer heat between the airflow and the working fluid to provide heating or cooling for the airflow. For example, AHU 106 can include one or more fans or blowers configured to pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 can receive input from sensors located within AHU 106 and/or within the building zone and can adjust the flow rate, temperature, or other attributes of the supply airflow through AHU 106 to achieve setpoint conditions for the building zone.

Figure 2:
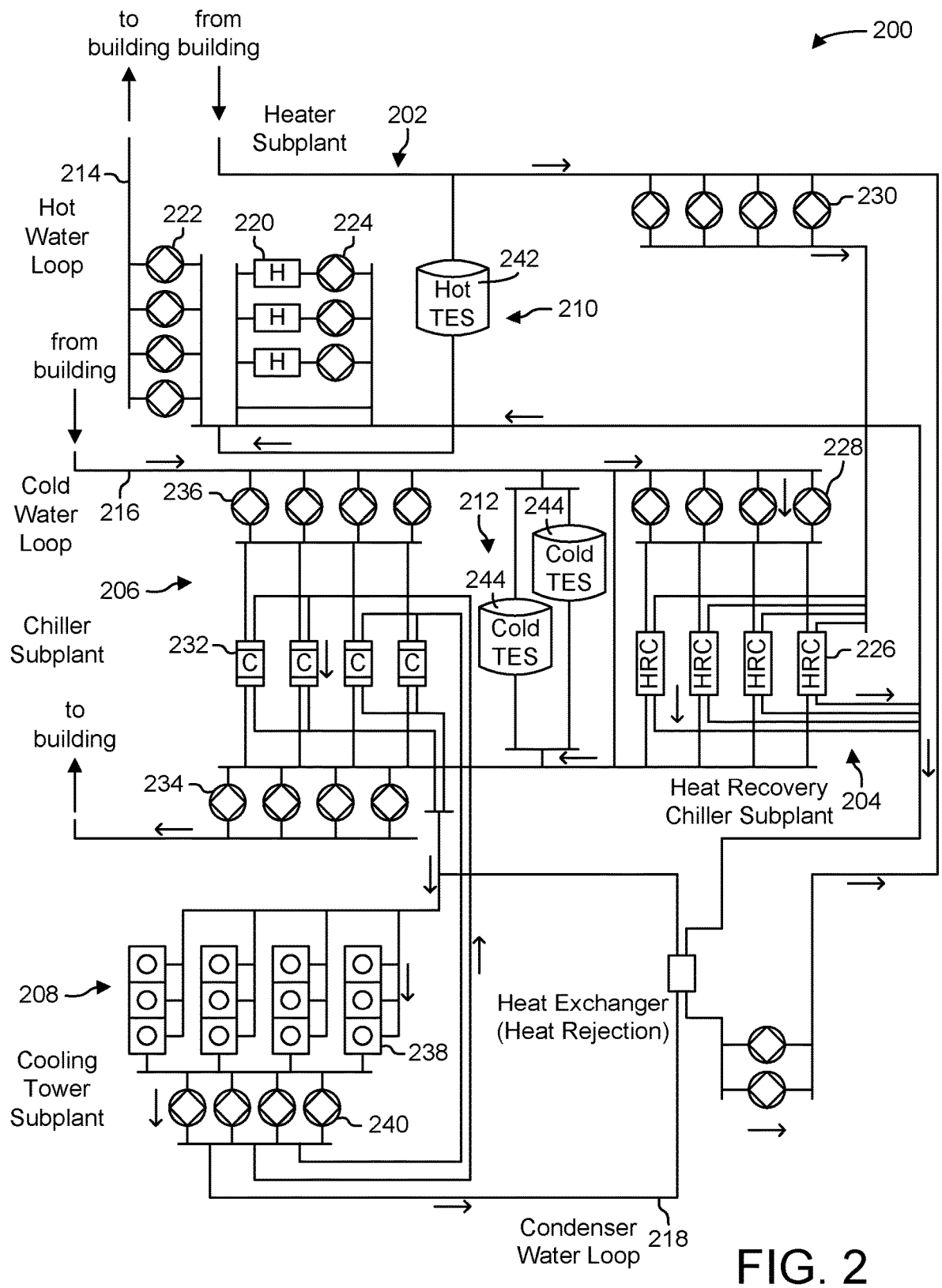
FIG. 2 is a block diagram of a waterside system that may be used in conjunction with the building of FIG. 1, according to some embodiments.

Referring now to FIG. 2, a block diagram of a waterside system 200 is shown, according to an exemplary embodiment. In various embodiments, waterside system 200 can supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and can operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 and building 10. Heat recovery chiller subplant 204 can be configured to transfer heat from cold water loop 216 to hot water loop 214 to provide additional heating for the hot water and additional cooling for the cold water. Condenser water loop 218 can absorb heat from the cold water in chiller subplant 206 and reject the absorbed heat in cooling tower subplant 208 or transfer the absorbed heat to hot water loop 214. Hot TES subplant 210 and cold TES subplant 212 can store hot and cold thermal energy, respectively, for subsequent use.

Hot water loop 214 and cold water loop 216 can deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) can be used in place of or in addition to water to serve the thermal energy loads. In other embodiments, subplants 202-212 can provide heating and/or cooling directly to the building or campus without requiring an intermediate heat transfer fluid. These and other variations to waterside system 200 are within the teachings of the present invention.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 can also include one or more pumps or valves configured to control the flow rate of the hot water into or out of hot TES tank 242. Cold TES subplant 212 is shown to include cold TES tanks 244 configured to store the cold water for later use. Cold TES subplant 212 can also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Figure 3:
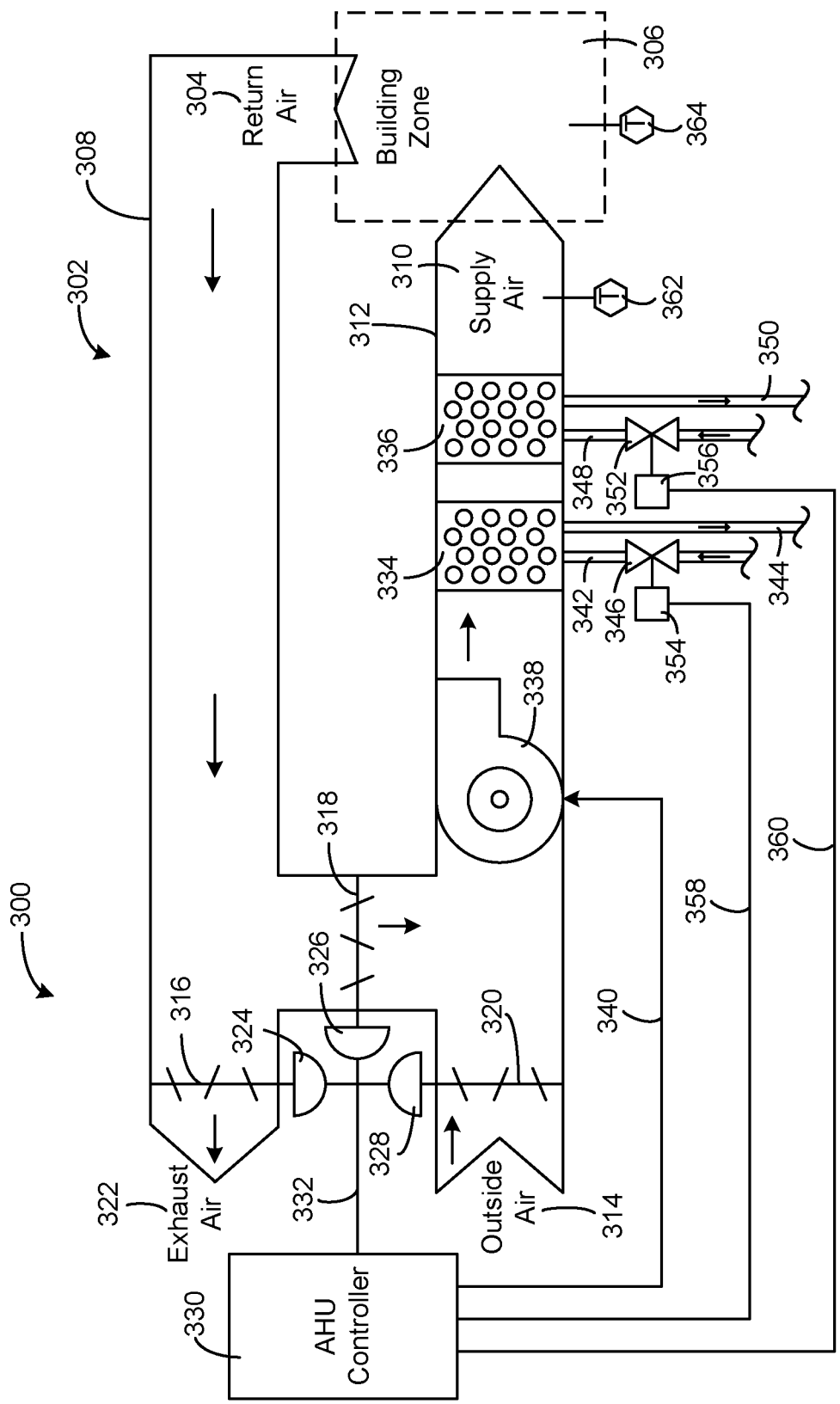
FIG. 3 is a block diagram of an airside system that may be used in conjunction with the building of FIG. 1, according to some embodiments.

Referring now to FIG. 3, a block diagram of an airside system 300 is shown, according to an exemplary embodiment. In various embodiments, airside system 300 can supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 can operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 can receive return air 304 from building zone 306 via return air duct 308 and can deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 can communicate with an AHU controller 330 via a communications link 332. Actuators 324-328 can receive control signals from AHU controller 330 and can provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 can communicate with fan 338 via communications link 340 to control a flow rate of supply air 310. In some embodiments, AHU controller 330 controls an amount of heating or cooling applied to supply air 310 by modulating a speed of fan 338.

Cooling coil 334 can receive a chilled fluid from waterside system 200 (e.g., from cold water loop 216) via piping 342 and can return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BAS controller 366, etc.) to modulate an amount of cooling applied to supply air 310.

Heating coil 336 can receive a heated fluid from waterside system 200 (e.g., from hot water loop 214) via piping 348 and can return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BAS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 can communicate with AHU controller 330 via communications links 358-360. Actuators 354-356 can receive control signals from AHU controller 330 and can provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 can also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 can control the temperature of supply air 310 and/or building zone 306 by activating or deactivating coils 334-336, adjusting a speed of fan 338, or a combination of both.

Still referring to FIG. 3, airside system 300 is shown to include a building automation system (BAS) controller 366 and a client device 368. BAS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BAS controller 366 can communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BAS controller 366 can be separate (as shown in FIG. 3) or integrated. In an integrated implementation, AHU controller 330 can be a software module configured for execution by a processor of BAS controller 366.

In some embodiments, AHU controller 330 receives information from BAS controller 366 (e.g., commands, setpoints, operating boundaries, etc.) and provides information to BAS controller 366 (e.g., temperature measurements, valve or actuator positions, operating statuses, diagnostics, etc.). For example, AHU controller 330 can provide BAS controller 366 with temperature measurements from temperature sensors 362-364, equipment on/off states, equipment operating capacities, and/or any other information that can be used by BAS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 can communicate with BAS controller 366 and/or AHU controller 330 via communications link 372.

Figure 4:
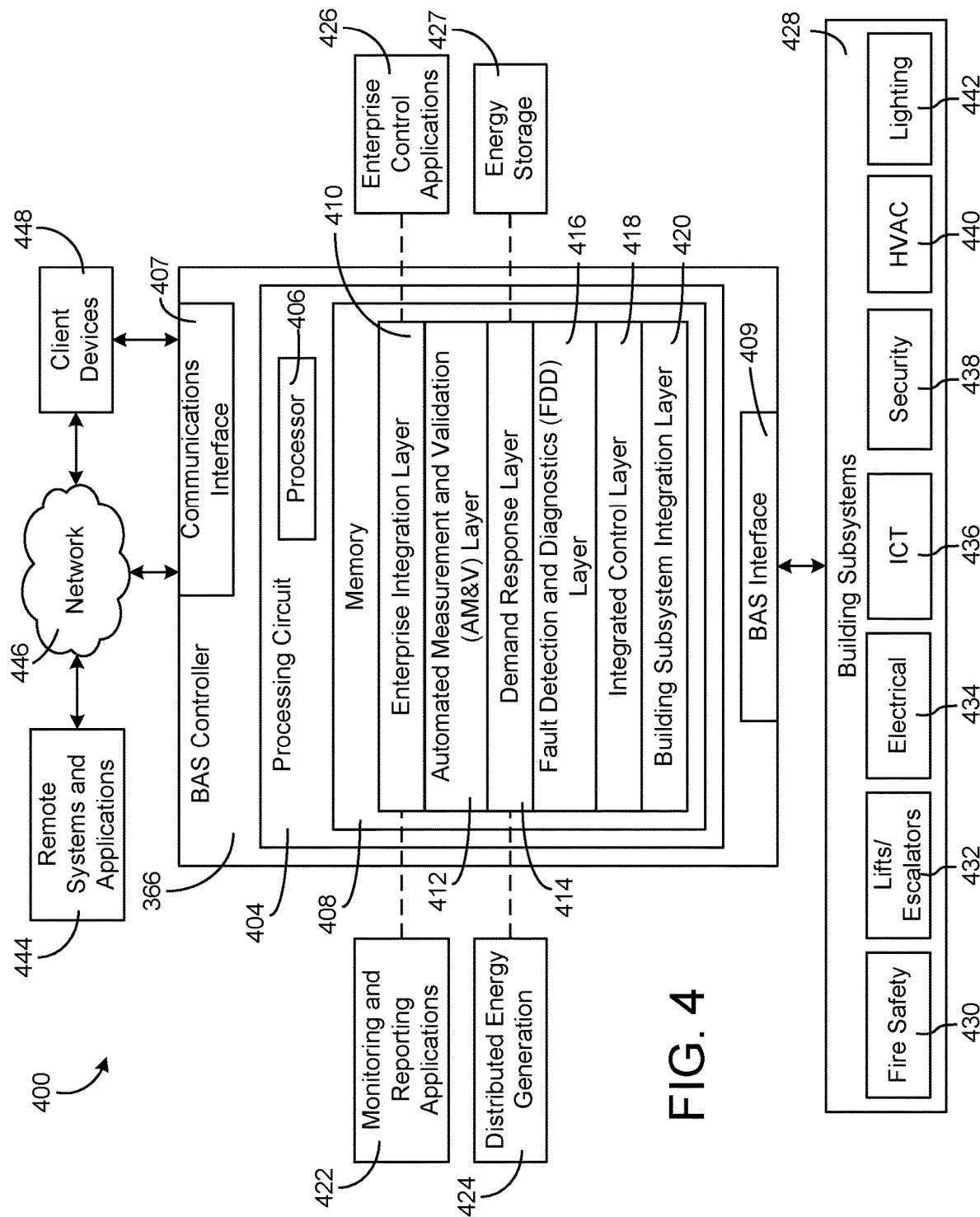
FIG. 4 is a block diagram of a building automation system (BAS) that may be used to monitor and/or control the building of FIG. 1, according to some embodiments.

Referring now to FIG. 4, a block diagram of a building automation system (BAS) 400 is shown, according to an exemplary embodiment. BAS 400 can be implemented in building 10 to automatically monitor and control various building functions. BAS 400 is shown to include BAS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 can also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices and servers, or other security-related devices.

Still referring to FIG. 4, BAS controller 366 is shown to include a communications interface 407 and a BAS interface 409. Interface 407 can facilitate communications between BAS controller 366 and external applications (e.g., monitoring and reporting applications 422, enterprise control applications 426, remote systems and applications 444, applications residing on client devices 448, etc.) for allowing user control, monitoring, and adjustment to BAS controller 366 and/or subsystems 428. Interface 407 can also facilitate communications between BAS controller 366 and client devices 448. BAS interface 409 can facilitate communications between BAS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In one embodiment, communications interface 407 is a power line communications interface and BAS interface 409 is an Ethernet interface. In other embodiments, both communications interface 407 and BAS interface 409 are Ethernet interfaces or are the same Ethernet interface.

Still referring to FIG. 4, BAS controller 366 is shown to include a processing circuit 404 including a processor 406 and memory 408. Processing circuit 404 can be communicably connected to BAS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to an exemplary embodiment, memory 408 is communicably connected to processor 406 via processing circuit 404 and includes computer code for executing (e.g., by processing circuit 404 and/or processor 406) one or more processes described herein.

In some embodiments, BAS controller 366 is implemented within a single computer (e.g., one server, one housing, etc.). In various other embodiments BAS controller 366 can be distributed across multiple servers or computers (e.g., that can exist in distributed locations). Further, while FIG. 4 shows applications 422 and 426 as existing outside of BAS controller 366, in some embodiments, applications 422 and 426 can be hosted within BAS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BAS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 can also or alternatively be configured to provide configuration GUIs for configuring BAS controller 366. In yet other embodiments, enterprise control applications 426 can work with layers 410-420 to optimize building performance (e.g., efficiency, energy use, comfort, or safety) based on inputs received at interface 407 and/or BAS interface 409.

Building subsystem integration layer 420 can be configured to manage communications between BAS controller 366 and building subsystems 428. For example, building subsystem integration layer 420 can receive sensor data and input signals from building subsystems 428 and provide output data and control signals to building subsystems 428. Building subsystem integration layer 420 can also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 can receive inputs from other layers of BAS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs can also include inputs such as electrical use (e.g., expressed in kWh), thermal load measurements, pricing information, projected pricing, smoothed pricing, curtailment signals from utilities, and the like.

According to an exemplary embodiment, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 can also include control logic configured to determine when to utilize stored energy. For example, demand response layer 414 can determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models can represent collections of building equipment (e.g., subplants, chiller arrays, etc.) or individual devices (e.g., individual chillers, heaters, pumps, etc.).

Demand response layer 414 can further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In an exemplary embodiment, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration can reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints can also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BAS devices or subsystems. For example, AM&V layer 412 can compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 can receive data inputs from integrated control layer 418, directly from one or more building subsystems or devices, or from another data source. FDD layer 416 can automatically diagnose and respond to detected faults. The responses to detected or diagnosed faults can include providing an alarm message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to an exemplary embodiment, FDD layer 416 (or a policy executed by an integrated control engine or business rules engine) can shut-down systems or direct control activities around faulty devices or systems to reduce energy waste, extend equipment life, or assure proper control response.

FDD layer 416 can be configured to store or access a variety of different system data stores (or data points for live data). FDD layer 416 can use some content of the data stores to identify faults at the equipment level (e.g., specific chiller, specific AHU, specific terminal unit, etc.) and other content to identify faults at component or subsystem levels. For example, building subsystems 428 can generate temporal (i.e., time-series) data indicating the performance of BAS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alarm a user to repair the fault before it becomes more severe.

Although some embodiments in the specification are described primarily with reference to HVAC equipment, it should be understood that the systems and methods described herein can be applicable to a wide variety of building equipment and/or other types of connected devices (e.g., HVAC equipment, LED lights, lighting systems mobile phones, elevator systems, fire safety systems, security systems, smart street lamps, cars, televisions, etc.) with embedded intelligence and communication capabilities.

Cloud Platform

Figure 5:
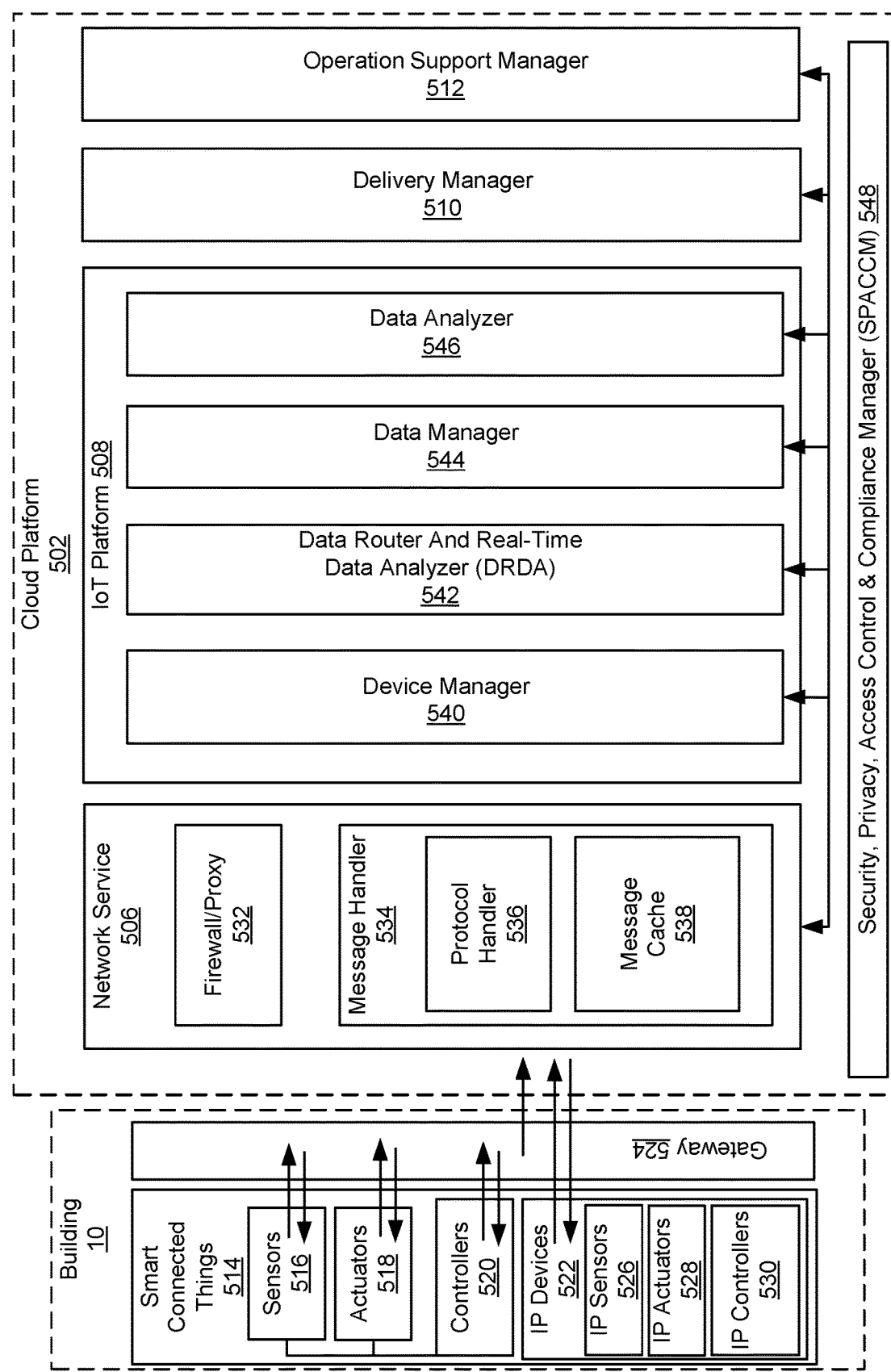
FIG. 5 is a block diagram of a building management platform system, according to some embodiments.

Referring now to FIG. 5, a building management platform system 500 is shown to include devices of building 10 coupled to a cloud platform 502, according to an exemplary embodiment. The cloud platform 502 can be one or more controllers, servers, and/or any other computing device that can be located in building 10 and/or can be located remotely and/or connected to the systems of building 10 via networks (e.g., the Internet). In some embodiments, the cloud platform 502 can be one or a combination of, for example, MICROSOFT AZURE, AMAZON WEB SERVICES (AWS), a private computing cloud, and/or a public computing cloud.

The cloud platform 502 can be configured to cause building 10 and the devices of building 10 to be a "self-conscious building." A self-conscious building can be a building in which building devices are interconnected via a cloud, e.g., the cloud platform 502. A building of interconnected devices can be "self-conscious" in the regard that rather than having a specific controller make specific decisions for only a portion of the equipment in the building 10, the cloud platform 502 can receive and aggregate data from all devices of building 10, and thus, can make decisions for building 10 based on an aggregate set of data.

In FIG. 5, the cloud platform 502 includes various services and components according to some embodiments. The cloud platform 502 can include a network service 506, an Internet of Things (IoT) platform 508, a delivery manager 510, and an operation support manager 512. The system 500 is shown to include smart connected things 514. Smart connected things 514, as shown in FIG. 5, include sensors 516, actuators 518, controllers 520, and IP devices 522. In various embodiments, the smart connected things 514 can include sensors, actuators, dampers, chillers, heaters, rooftop units (RTUs), thermostats, air handling units (AHUs), and/or any other type of equipment or device that can be installed within a building (e.g., fans, pumps, valves, and/or the like) 10. Many of these devices are described with reference to FIGS. 1-4. The sensors 516 can include one or more devices that can be configured to measure various environmental conditions (e.g., light intensity, occupancy, temperature, humidity, air quality etc.) or the status of pieces of equipment (e.g., motor temperature, fan speed, coil temperature, compressor speed, etc.). The actuators 518 can be any device that can be configured to affect an environmental change in building 10 (e.g., maintain a setpoint in building 10, maintain an air quality level in building 10, and/or the like).

The controllers 520 can be any device that can be connected to the sensors 516 and/or actuators 518. The controllers 520 can be configured to operate the actuators 518 and/or collect data from the sensors 516. In this regard, the controllers 520 can be configured to collect data from the sensors 516 and control the actuators 518 based on the data received from the sensors 516. The sensors 516, the actuators 518, and the controllers 520 may or may not be configured to communicate via an Internet based network, but are configured to communicate with each other via a non-Internet network (e.g., BACNET, CAN BUS, etc.). In this regard, the sensors 516, the actuators 518, and the controllers 520 may not be able to communicate directly with cloud platform 502, if the device are not Internet enabled, but can communicate with the cloud platform 502 via a gateway 524. The cloud platform 502 can be configured to communicate via both non-Internet based networks and Internet based networks.

The IP devices 522 can be any device in building 10 that is connected to the cloud platform 502 via an Internet based network. In this regard, the IP devices 522 can include the hardware and/or software necessary to communicate via an Internet based network. The IP devices 522 can be configured to communicate directly to the cloud platform 502 rather than communicating to the cloud platform 502 via the gateway 524. The IP devices 522 are shown to include IP sensors 526, IP actuators 528, and IP controllers 530. The IP sensors 526 can be similar to the sensors 526. However, the IP sensors 526 can communicate directly with the cloud platform 502 (e.g., the IP sensors 526 can communicate via an Internet based network). Similarly, the IP actuators 528 can be similar to the actuators 518 and the IP controllers 530 can be similar to the controllers 520. Unlike the actuators 518 and the controller 520, the IP actuators 528 and the IP controllers 530 can be configured to communicate directly to the cloud platform 502 via an Internet based network, instead of communicating to the cloud platform 502 via the gateway 524.

The gateway 524 can be any kind of network gateway that is configured to aggregate and enrich data received from the smart connected things 514. In some embodiments, the gateway 524 can be used to connect the equipment of the smart connected things 514 among each other in addition to connecting the smart connected things 514 to the cloud platform 502. In this regard, the equipment of the smart connected things 514 can be legacy equipment that may not have Internet connectivity, devices that can communicate via a non-Internet based network, and/or new equipment that does have Internet connectivity that can communicate via an IP based network. The gateway 524 can get, retrieve, query, and/or receive data from the smart connected things 514 and/or control the smart connected things 514 based on instructions or analytics results received from the cloud platform 502. The gateway 524 can provide network security, access control, and unique address of legacy devices endpoints for remote access and protocol mediation services. In some embodiments, the gateway 524 is a general-purpose gateway solution made by any of a variety of hardware manufacturers (e.g., INTEL®, FREESCALE®, DELL®, TEXAS INSTRUMENTS®, etc.). In some embodiments, the gateway 524 is a network connection engine (NCE) or a mobile access portal (MAP) gateway used to connect building management systems and smart equipment. The gateway 524 can use various Internet based protocols (e.g., Constrained Application Protocol (CoAP), Extensible Message and Presence Protocol (XMPP), Advanced Message Queuing Protocol (AMQP), Message Queue Telemetry Transport (MQTT), and/or the like) and web based common data exchange (e.g., Hypertext Transfer Protocol (HTTP), Representational State Transfer (RESTful), and/or the like) to send data from the smart connected things 514 to the cloud platform 502.

The network service 506 can provide access to the Internet and/or can provide access to other types of data networks, such as a local area network (LAN), a wide area network (WAN), a cellular network, a satellite network, a radio network, or any other type of data network or combination thereof. In some embodiments, the network service 506 includes a firewall/proxy 532 and a message handler 534 that includes a protocol handlers 536 and a message cache 538. The network service 506 can include any number of computing devices (e.g., computers, servers, routers, network switches, and/or the like) configured to transmit, receive, or relay data. The network service 506 can further include any number of hardwired and/or wireless connections.

In some embodiments, the network service 506 can include services that facilitate managing fixed or wireless communication with the smart connected things 514. Network vendors can include, for example, cellular telecommunications providers (e.g., VERIZON®, T-MOBILE®, AT&T®, etc.) as well as Internet service providers (e.g., COMCAST®, AT&T®, etc.). Communications via the network service 506 can leverage enterprise contracts and partnerships to optimize the cost of data transmission. Many network carriers provide a secure connection option as a part of premium services. However, a similar degree of network securities can be achieved by employing a trust platform chip in the smart connected things 514 and using encrypted messaging such as AMQP via an IP based secure transport.

The firewall/proxy 532 can be any firewall and/or proxy which protects the smart connected things 514 from hacking, spyware, malware, or other threats or computer viruses. In this regard, the firewall/proxy 532 can allow the smart connected things 514 to be connected to the cloud platform 502 and/or the Internet while minimizing the risk that the smart connected things 514 can be hacked and/or otherwise used by unauthorized persons who can attempt to access the smart connected things 514 via the Internet or any other network. The message handler 534 can be configured to facilitate communication between the smart connected things 514 and the cloud platform 502. For example, the message handler 534 can be configured to send and/or receive data directly from the IP devices 522 (e.g., the IP sensors 526, the IP actuators 528, and/or the IP controllers 530). Further, the message handler 534 can be configured to send and receive data indirectly from the sensors 516, the actuators 518, and/or the controllers 520 via the gateway 524.

The message handler 534 is shown to include the protocol handler 536 and the message cache 538. In some embodiments, the protocol handler 536 can be configured to decode and/or otherwise process the data received from the smart connected things 514 based on the network protocol used to transmit the data to the cloud platform 502. Further, the protocol handler 536 can send messages to the smart connected things 514 based on a particular network protocol. The message cache 538 can be any type of data cache (e.g., hardware and/or software component) that accounts for redundancies in messaging. For example, the message cache 538 can be any type of network cache which stores data that is commonly accessed by and/or frequently sent to the smart connected things 514. By storing the highly requested and/or highly transmitted data locally in the message cache 538, the highly requested data does not need to be repeatedly requested from other various components of the cloud platform 502.

The system 500 is shown to include, a security, privacy, access control, and compliance manager (SPACCM) 548. Security can be provided at both the device (e.g., the smart connected things 514) and network levels (e.g., the cloud platform 502). The same intelligence that enables devices to perform their tasks can also enable them to recognize and counteract threats. At any given point in time, the IoT platform 508 can support multiple users and stake holders including building owners, building operators, tenants, service technicians, manufacturers, and the like. The cloud platform 502 can allow remote accessibility of the smart connected things 514 (e.g., via the Internet). For this reason, remote accessibility of connected products can involve complex identity management through a unified login and product management experience that can be facilitated by the SPACCM 548. For example, a single login can allow a customer to sign on to all authorized connected products and services associated with the IoT platform 508.

Still referring to FIG. 5, the IoT platform 508 is shown to include a device manager 540, a data router and real-time data analyzer 542, a data manager 544, and a data analyzer 546. The IoT platform 508 can include various IoT solution providers, such as MICROSOFT®, INTEL®, CISCO®, GOOGLE®, AMAZON®, SAP®, QUALCOMM®, ORACLE®, and/or the like, that offer general-purpose solutions with developer tools for customization, in addition to AXEDA®, ETHERIOS®, THINGWORX®, GENERAL ELECTRIC® (GE®), and/or the like that offer integrated industry solutions. In some embodiments, the IoT platform 508 leverages the industry's first on-premises, off-premises hybrid architecture (e.g., MICROSOFT AZURE®).

The device manager 540 can be configured to identify the smart connected things 514. In some embodiments, the device manager 540 identifies the smart connected things 514 via a token sent by the smart connected things 514 and/or via any other login credential or unique identifier. For example, the token can be an encrypted key that the device manager 540 can decrypt. Based on the identity of a device of the smart connected things 514, the device manager 540 can allow the device to retrieve data and/or software stored by the IoT platform 508. The device manager 540 can be further configured to generate control signals for the smart connected things 514 and/or otherwise control the functionality of the smart connected things 514.

In some embodiments, the data router and real-time data analyzer (DRDA) 542 can be configured to route data in the cloud platform 502 and/or to the building 10, in addition to performing real-time data analytics. The DRDA 542 can be configured to route messages received from the smart connected things 514 to various components of the cloud platform 502, devices of the building 10, and/or other devices connected to the Internet. Further, the DRDA 542 can be configured to perform complex event processing. The DRDA 542 can be configured to infer (or derive) events and/or event patterns based on data received from various data streams. The data streams can be data streams received from the building 10, data streams received from the cloud platform 502, data streams received from the Internet, and/or any other received data and/or data stream. Complex event processing can identify various events quickly (e.g., in real time). The events can be security threats, emergencies for building 10, and/or other events which the cloud platform 502 needs to respond to quickly. For this reason, the DRDA 542 can be configured to respond to any event which it determines needs a quick and/or immediate response.

In some embodiments, the data manager 544 can include one or more databases, memory storage units, and/or any other hardware and software component that can store and/or manage information. The data manger 540 can include file systems such as Hadoop Distributed File System (HDFS), various databases such as key-value storage, relational database management systems (RDBMS), graph databases, various mapping structures, and/or any other suitable system for storing data. In various embodiments, the data manager 540 can be configured to manage, organize, integrate, and store data, and/or send data to various components of the cloud platform 502. For example, the data manager 544 can generate various reports and/or combine (e.g., integrate) data from disparate devices in the building 10, various components of the cloud platform 502, and/or the Internet.

In some embodiments, the data analyzer 546 can be configured to perform data processing on data received from the smart connected things 514, various components of the cloud platform 502, and/or the Internet. The data analyzer 546 can be configured to perform parallel data analytics on received data, and in some embodiments, can use a software framework such Hadoop to perform the data processing. In some embodiments, the data analyzer 546 can be configured to generate business intelligence metrics. Business intelligence metrics can be generated based on the received data. In some embodiments, the business intelligence metrics indicate power consumption of a building, predicted operating costs of new equipment, equipment replacements, and/or any other intelligence metric that can be generated from the received data. Further, the data analyzer 546 can be configured to perform data mining to determine various patterns in large data sets that the data analyzer 546 can receive and/or collect. Further, the data analyzer 546 can be configured to perform any kind of time series data analysis (e.g., data cleansing, data extrapolation, interpolation, averaging). Time series data analysis can be temperatures of a zone collected by one or more sensors of the building 10 (e.g., the smart connected things 514). For example, the data analyzer 546 can "cleanse" the time series data by compressing the data points based on an upper threshold and/or a lower threshold.

In some embodiments, the cloud platform 502 includes the delivery manager 510. The delivery manager 510 is related to a channel and distribution strategy and can include a product distributor. A product distributor can include off-line distribution of IoT related products or services and on-line distribution of solutions for a certain customer and/or a market. The delivery manager 510 can include various APIs that enable application developers to deliver information products. The delivery manager 510 can include data visualization, exploration tools, and/or any other method for rapidly delivering data related to building 10 to an end user. In some embodiments, the delivery manager 510 is integrated with various enterprise applications (e.g., applications owned and/or operated by GOOGLE®, MICROSOFT °, and/or any other suitable entity).

In some embodiments, the operation support manager 512 can facilitate the integration and optimization of devices, systems, and components to unite interrelated applications. In some embodiments, the operation support manager 512 can include various financial and/or customer services. For example, the operation support manager 512 can include various applications for customer relationship management (CRM), enterprise resource planning (ERP), customer billing, reporting information regarding the building 10, and/or any other suitable business related application. For example, the operation support manager 512 can facilitate providing data from the IoT platform 508 to outside businesses (e.g., insurance companies, utility providers, governmental agencies, and/or the like) that can have an interest in such data.

Figure 6:
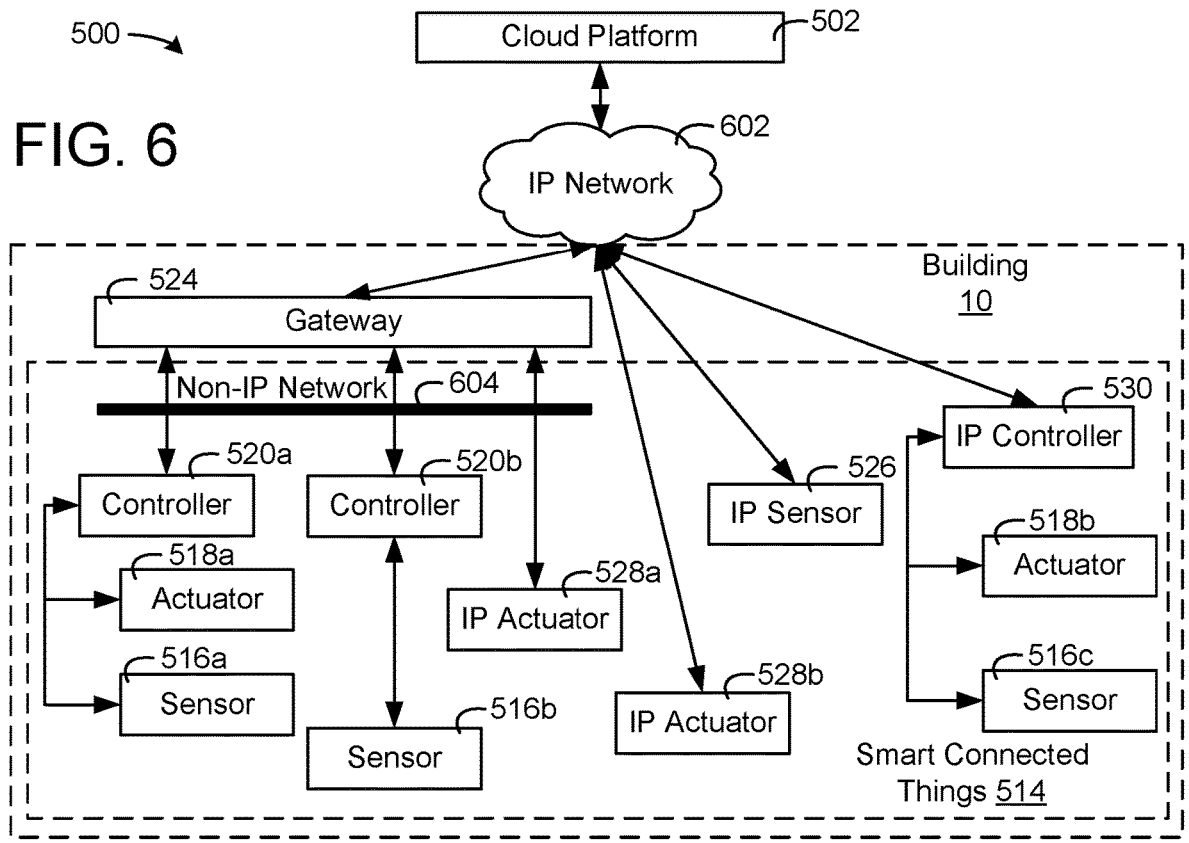
FIG. 6 is a block diagram of the building management platform system of FIG. 5 in greater detail.

Referring now to FIG. 6, the smart connected things 514 and the building 10 as described with reference to FIGS. 1-5 is shown in greater detail, according to an exemplary embodiment. In FIG. 6, the cloud platform 502 as described with further reference to FIG. 5 is shown to be connected to an IP network 602. The IP network 602 can be any IP network and/or communication protocol. For example, the IP network 602 can be and/or include TCP/IP, Ethernet, Wi-Fi, Zigbee IP, a building WAN, and/or the like. The gateway 524, as described with further reference to FIG. 5, is shown to communicate with both the IP network 602 and a non-IP network 604. The non-IP network 604 can include networks and/or protocols that are not IP based. For example, the non-IP network 604 can be and/or include Zigbee, BACnet, controller area network (CAN) protocol, Modbus, and/or any other suitable non-IP based network and/or protocol.

In FIG. 6, the controllers 520a and 520b are shown to communicate to the cloud platform 502 via the gateway 524. The controllers 520a and 520b can be similar to or the same as the controllers 520 as described with reference to FIG. 5. The actuator 518a and the sensor 516a can be connected to the cloud platform 502 via the controller 520a, and the sensor 516b can be connected to the cloud platform 502 via the controller 520b. The actuator 518a, the sensor 516a, and sensor 516b can be similar to or the same as the actuators 518 and/or the sensors 516 as described with reference to FIG. 5. The IP actuator 528a can be connected to the cloud platform 502 via the gateway 524, even though the IP actuator 528b is able to communicate directly with the IP network 602. The IP actuator 528a can be the similar to or the same as the IP actuator 528 as described with reference to FIG. 5.

The IP sensor 526, the IP actuator 528b, and the IP controller 530 are shown to communicate directly with the cloud platform 502 via the IP network 602. The IP sensor 526 and the IP controller 530 are described with reference to FIG. 5, while the IP actuator 528*b* can be the same as or similar to the IP actuator 528 as described with reference to FIG. 5. As shown, the IP sensor 526, the IP actuator 528*b*, and IP controller 530 communicate to the cloud platform 502 without first communicating to the gateway 524. The IP controller 530 is shown to communicate with the actuator 518*b* and the sensor 516*c*, both of which may not be configured to communicate with the IP network 602. The actuator 518*b* and the sensor 516*c* can be the same as or similar to the actuators 518 and the sensors 516 as described with reference to FIG. 5. The IP controller 530 can effectively act as a gateway for the actuator 518*b* and the sensor 516*c* and can connect both devices to the cloud platform 502.

Even though some devices of building 10 must communicate to the cloud platform 502 via the gateway 524 while other devices can communicate directly with the cloud platform 502, the data of all of the devices of building 10 can be "joined together" via the cloud platform 502 and/or utilized by the cloud platform 502 as an aggregate data set, in some embodiments. The devices are "joined together" in the sense that the cloud platform 502 can make decisions for all of the devices of building 10 based on all of the data retrieved from all of the devices of building 10. In this regard, building 10 can be understood to be a "self-conscious" building. A "self-conscious" building is a building in which decisions are made based on a complete set of data of all (or a desired number of) building devices.

Figure 7:
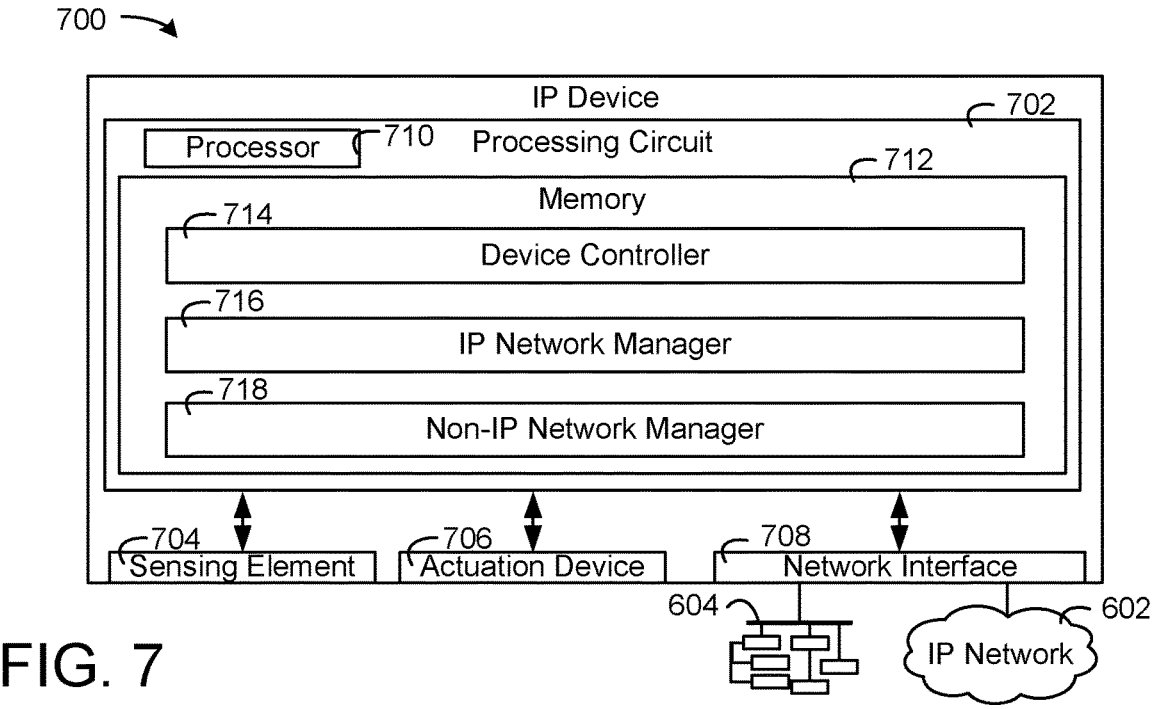
FIG. 7 is a block diagram of an IP device, according to some embodiments.

Referring now to FIG. 7, an IP device 700 is shown, according to an exemplary embodiment. The IP device 700 can be any one of the IP devices 522 as described with reference to FIG. 5. The IP device 700 is shown to include a network interface 708. The network interface 708 can be a hardware interface which allows the IP device 700 to communicate with both the non-IP network 604 and the IP network 602. The IP device 700 is shown to include a sensing element 704 and an actuation device 706. The sensing element 704 can be one or more hardware components configured to measure temperature, pressure, humidity, pressure, air quality, and/or any other environmental and/or non-environmental condition. The actuation device 706 can be any device that the IP device 700 can control to affect an environmental change in the building 10. For example, the actuator device 706 can be an electric motor that IP device 700 can use to control a valve. In some other examples, the actuator device 706 can be a fan, a boiler, a compressor, and/or the like.

The IP device 700 includes a processing circuit 702 that includes a processor 710 and memory 712. In this regard, information stored on the memory 712 can be executed on the processor 710. The memory 712 is shown to include a device controller 714. In some embodiments, the device controller 714 can send data collected from the sensing element 704 to the cloud platform 502 via the IP network 602 (or via the gateway 524). In various embodiments, the device controller 714 receives control commands from the cloud platform 502 for the actuation device 706. In this regard, the device controller 714 can be configured to control the actuator device 706 based on the commands received from the cloud platform 502.

The device controller 714 can be configured to send control commands to various devices connected to the IP device 700, receive data from the various devices, receive data from the sensing element 704, and/or send commands to the actuation device 706. For example, if the IP device 700 is the IP controller 530 as described with references to FIG. 6, the device controller 714 can be configured to control the actuator 518*b* and/or the sensor 516*c*. In this regard, the device controller 414 can send data to the cloud platform 502 that the device controller 714 receives from the actuator 518*b* and/or the sensor 516*c*. Further, the device controller 714 can be configured to send control commands to the actuator 218*b* and/or the sensor 516*c* based on messages and/or data the device controller 714 can receive from the IP network 602.

The IP network manager 716 can be configured to facilitate communicate with the IP network 602. In some embodiments, the IP network manager 716 includes instructions for the TCP/IP protocol architecture (e.g., the application layer, the host-to-host transport layer, the internet layer, and/or the network interface layer). The protocols may include transport layer protocols (e.g., TCP and/or UDP). The Internet layer protocols may include Internet Protocol Version 4 (IPv4) and/or Internet Protocol Version 6 (IPv6), or the like. The non-IP network manager 718 can be configured to facilitate communication with the non-IP network 604 and/or any other non-IP based network or communication protocol for communicating with other devices in building 10. These protocols may include, for example, CAN, BACnet, Modbus, and/or the like.

Device Twinning, Natural Language Processing, and Block Chain

Figure 8:
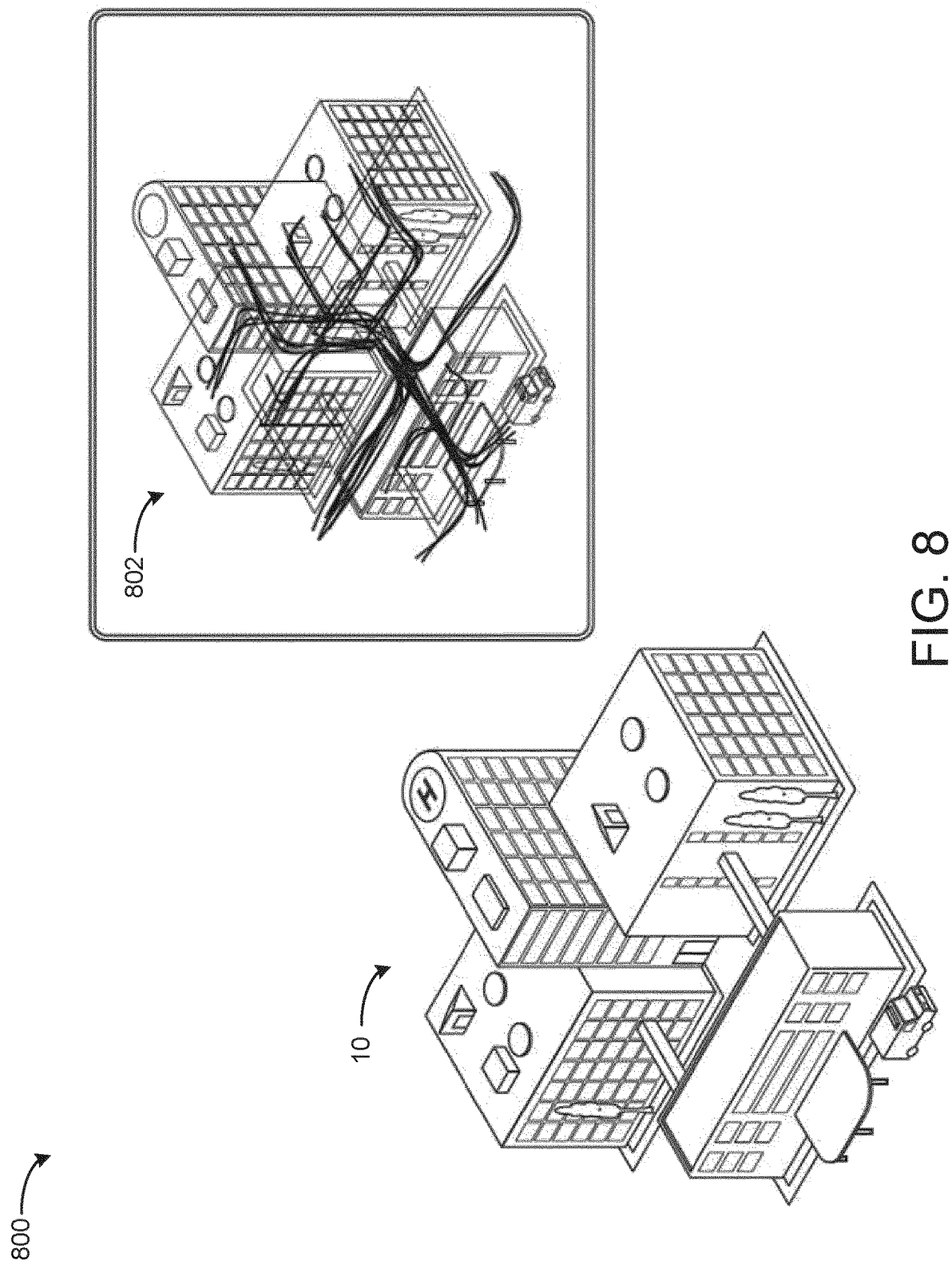
FIG. 8 is a conceptual diagram of a virtual representation of a building, according to some embodiments.

Referring now to FIG. 8, a twinning diagram 800 is shown including a building 10 and a virtual building representation 802 of the building 10, according to an exemplary embodiment. Virtual building representation 802 can be a virtual representation of the systems, devices, and environmental conditions of the building 10 that is created, updated, and used in analytics by the cloud platform 502.

In some embodiments, the virtual building representation 802 can include various digital twins. The digital twins may be digital representations of physical equipment in the building 10. For example, a chiller (e.g., the chiller 206 as described with reference to FIG. 2) may be a physical device within the building 10 and may also have a virtual representation of the chiller 206 that is stored in the cloud platform 502 as described with reference to FIG. 5. A digital twin may be a model stored and trained by the cloud platform 502. The cloud platform 502 can utilize the trained model to generate predictions regarding the behavior of the physical device which is represented by the digital twin. In some embodiments, the cloud platform 502 as described with reference to FIG. 5 can be configured to maintain multiple virtual twins of the devices of the building 10 and provide analytics to an end user.

Performing analytics on the cloud platform 502 based on digital twins may enable more computational intensive analytics to be performed that would not otherwise be able to be performed by the controllers of the equipment of the building 10. For example, utilizing digital twin for the building 10 improves the maintenance, performance, and/or design and development the physical devices of the building 10. The construction of expensive prototypes of devices can be replaced via generating virtual device twins if the devices. Having such a virtual model of the device can simulate actual conditions or extreme conditions, so that the maintenance, performance, and/or design and development of the physical devices can be tested, improved, or optimized.

In some embodiments, a device twin for a physical device can accompany the physical device during part of or the entire lifecycle of the physical device. The various sensor devices of the physical device can periodically and/or continuously transmit information to the cloud platform 502 so that the cloud platform 502 can develop and configure the device twin. In some embodiments, the device twins can aid field technicians in analyzing the information provided by the physical devices for performing maintenance on the corresponding physical devices. The field technician can utilize the device twin to identify and perform remote configuration and maintenance of the corresponding physical device, identify the equipment health for potential device failure predictions and predictive maintenance, perform auto provisioning of the physical device, perform auto parameter tuning of the physical device, perform remote access and commissioning of the physical device, and improve future product design and/or development.

In some embodiments, communications between the device twins and the cloud platform 502 is secured via block chain technology. Since the digital twin transmits data to the cloud platform 502, which is an off premise system, there may be apprehensions on security of the physical devices that are directly tied to the corresponding device twins. For example, in some embodiments, using block chain technology, smart contracts can be developed to cover some of the critical service level agreements (SLAs) between service providers and building owners. Because block chain is immutable in nature, it can be easily determined if there are any deviations in the data that can result from unauthorized access. Securing communications using block chain will be further described with reference to FIG. 12.

Figure 9:
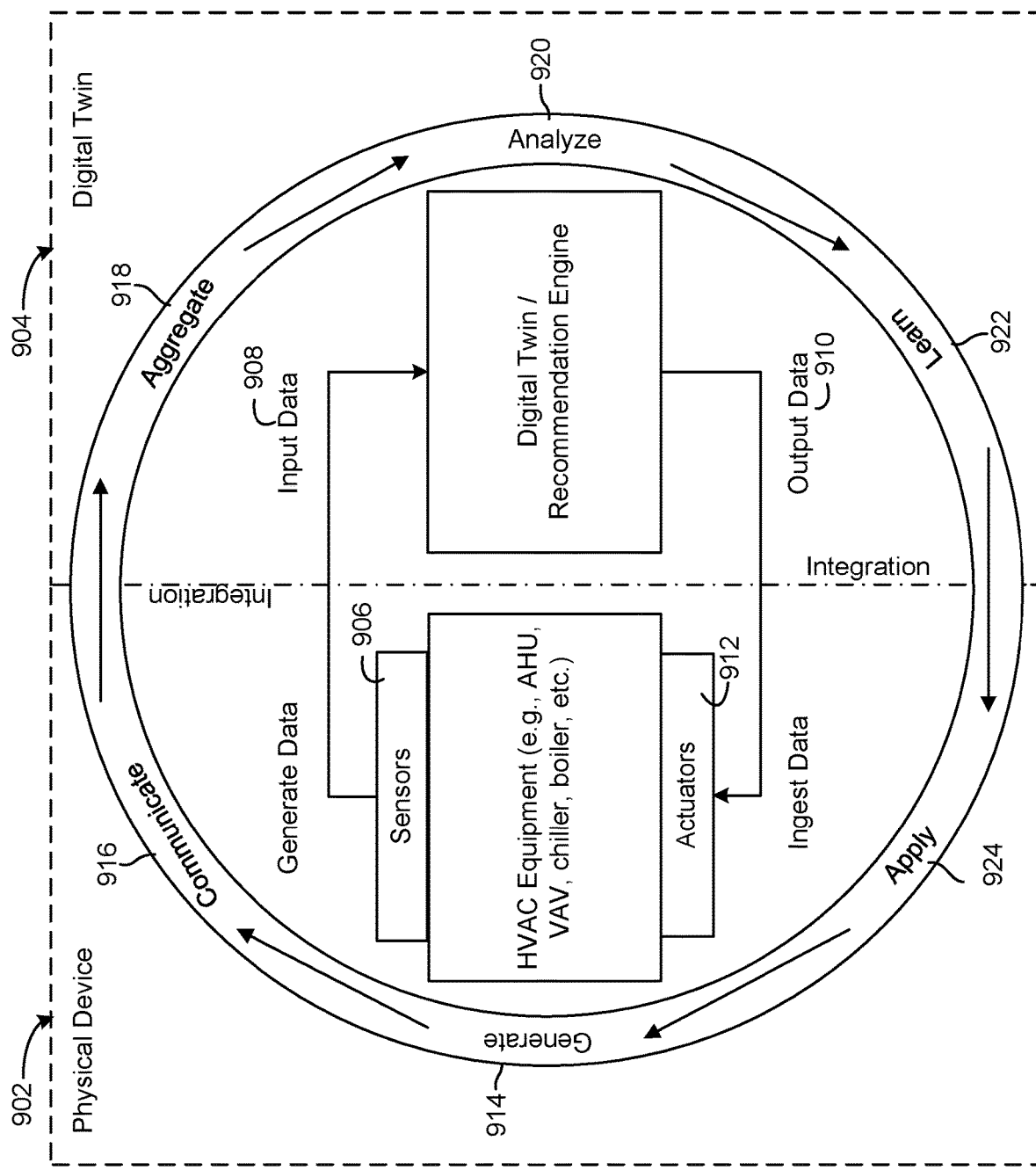
FIG. 9 is a diagram of a process for performing digital twinning of devices of a building, according to some embodiments.

Referring now to FIG. 9, a block diagram and a process for performing digital twinning of devices of the building 10 with the cloud platform 502 is shown, according to an exemplary embodiment. FIG. 9 illustrates a physical device 902 of the building 10 that includes sensors 906 and actuators 912. Furthermore, the physical device 902 has a digital twin 904 that is a digital representation of the physical device 902. In some embodiments, the digital twin 904 can be generated by the cloud platform 502 for the physical device 902, and can be used by the cloud platform 502 to perform analytics to generate changes, recommendations, and/or controls for the physical device 902.

The physical device 902 can be any BMS, HVAC, or building device as described with reference to FIGS. 1-7. As a non-limiting example, the physical device 902 can be the cooling tower subplant 208 or the chiller subplant 206. In other examples, the physical device 902 can be or include one of the smart connected things 514. For example, the sensors 906 and actuators 912 may be the same as or similar to the sensors 516, the actuators 518, the IP sensors 526, and/or the IP actuators 528 as described with reference to FIGS. 5-6.

In some embodiments, the physical device 902 may have IoT capabilities. For example, the physical device 902 can be configured to communicate with the cloud platform 502 directly or indirectly via another device (e.g., a gateway). Furthermore, to enable secure transmission of configuration data and settings, the physical device 902 may have access to a private block chain system, in some embodiments.

Still referring to FIG. 9, the cloud platform 502 can generate (or create) 914 the digital twin 904 for the physical device 902. For example, the cloud platform 502 may receive various specifications for the physical device 902, aggregated data for the physical device 902, and/or use a user defined model for the physical device 902.

The physical device 902 can communicate 916 generated data (i.e., input data 908) that it collects (e.g., from the sensors 906) to the cloud platform 502. For example, the sensors 906 may gather data for the physical device 902 such as zone temperature values, valve positions, and/or the like. This data can be transmitted via a network to the cloud platform 502. The cloud platform 502 can collect 918 the input data 908 it receives or collects from the physical device 902. The input data 908 can be used to update and/or train the digital twin 904.

Based on the digital twin 904 and/or the input data 908, the cloud platform 502 can analyze 920 and learn 922 from the input data 908 (e.g., to generate output data 910). For example, the cloud platform 502 may determine that a component of the physical device 902 is not functioning properly and should be replaced. In another example, the cloud platform 502 may determine that a particular setting for the actuators 912 should be adjusted to optimize energy savings and/or user comfort of the building 10. The cloud platform 502 can provide the output data (e.g., commands, operating settings, temperature set points, etc.) 910 to the physical device 902. Based on the output data 910 provided to the physical device by the cloud platform 502, the physical device 902 can apply 924 the output data 910 by acting on ingested data, for example, by implementing changes to the operation of the actuators 912.

Figure 10:
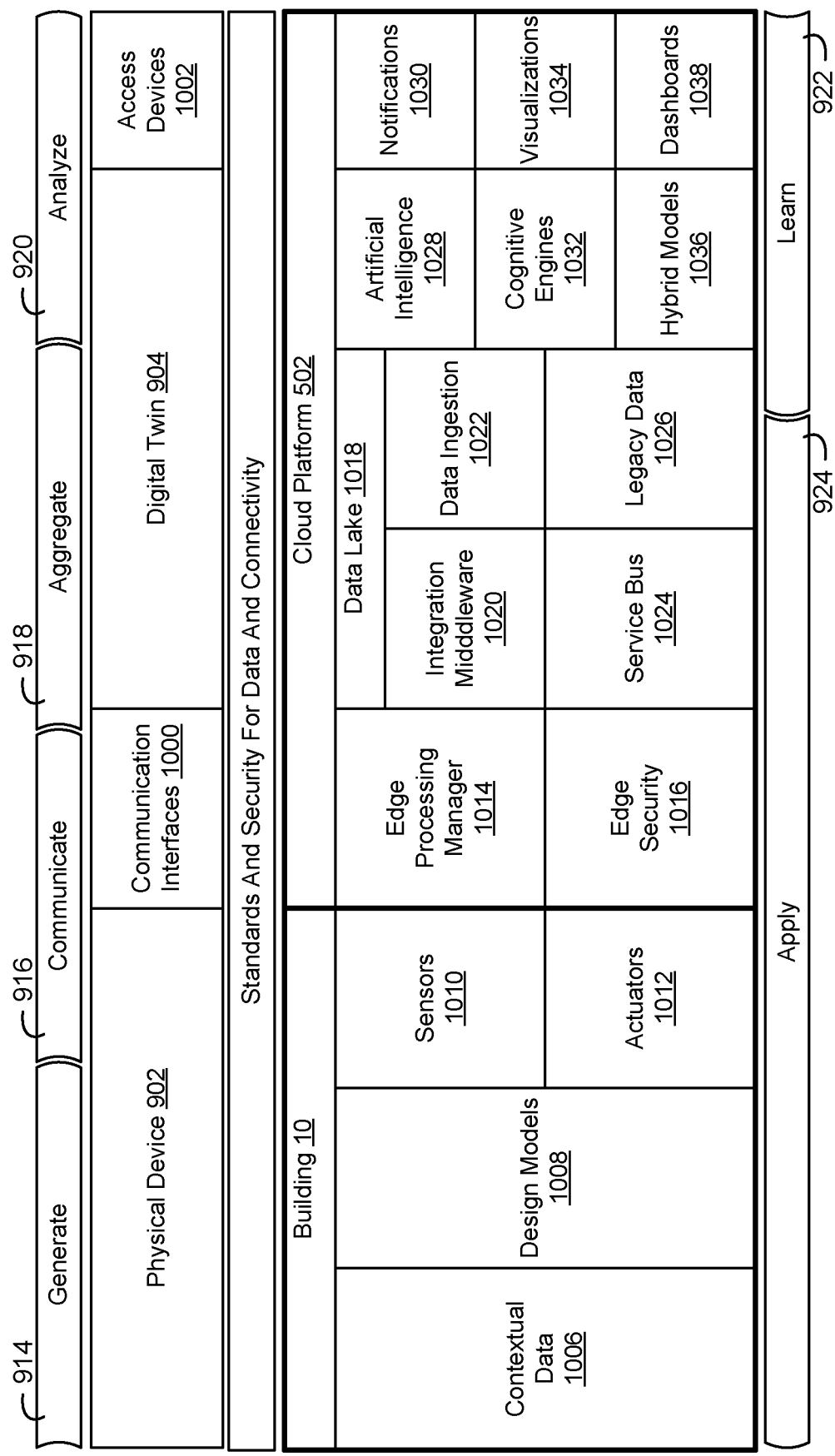
FIG. 10 is a block diagram illustrating the building management platform system in greater detail, according to some embodiments.

Referring now to FIG. 10, a block diagram illustrating the cloud platform 502 in greater detail is shown, according to an exemplary embodiment. Furthermore, FIG. 10 illustrates the process of FIG. 9 within the context of the components of the building 10 and the cloud platform 502. The building 10 is shown to be associated with contextual data 1006, design models 1008, sensors 1010, and actuators 1012. The cloud platform 502 is shown to include an edge processing manager 1014, edge security 1016, a data lake 1018, integration middleware 1020, data ingestion 1022, a service bus 1024, legacy data 1026, artificial intelligence 1028, cognitive engines 1032, hybrid models 1036, notifications 1030, visualizations 1034, and dashboards 1038.

The contextual data 1006 may be information for the sensors 1010 and/or actuators 1012 that indicates contextual information of the sensors 1010 and/or the actuators 1012. For example, a particular occupancy sensor may be located in a particular zone, "Zone A." This contextual data 1006 can be communicated to the cloud platform 502 for use in managing the devices of the building 10. Furthermore, design models 1008 may correspond to particular configuration data files or data design files for the sensors 1010 and/or the actuators 1012. These design models 1008 may include product specifications that include parameters, tolerances, and other information indicative of the correct or incorrect operation of the sensors 1010 and/or actuators 1012. For example, the design models 1008 may include Computer-Aided Design (CAD) models or other visual representations of the sensors 1010 and/or the actuators 1012.

The cloud platform 502 is shown to include various components (e.g., pieces of software stored on transitory and/or non-transitory storage mediums) that may be implemented by processing circuits, such as logic circuits (e.g., ASICs), for example. The edge processing manager 1014 may be a component that causes and/or manages edge based processing. For example, the edge processing manager 1014 can control processing that may occur locally on the sensors 1010 and/or actuators 1012, rather than directly by the cloud platform 502. The edge security 1016 may be a component configured to provide data security and data integrity for the cloud platform 502, the sensors 1010, and/or the actuators 1012. The edge security 1016 can be configured to implement firewalls, block chain, cryptography, and/or other security measures.

The cloud platform 502 is shown to include a data lake 1018. The data lake 1018 can be a storage repository that holds a large amount of raw data of the sensors 1010 and/or the actuators 1012. In some embodiments, the data lake 1018 is a Hadoop data lake. The data lake 1018 may use a flat storage architecture to store the data. In some embodiments, the data may be stored in the data lake 1018 in a native format of the sensors 1010 and/or the actuators 1012. In some embodiments, each data element of the data lake 1018 is assigned a unique identifier by the cloud platform 502 and tagged with a set of extended metadata tags. When the cloud platform 502 requires data of the sensors 1010 and/or the actuators 1012 in order to generate various data metrics (e.g., the notifications 1030, the visualizations 1034, and/or the dashboards 1038), the cloud platform 502 can query the data lake 1018 for the required data.

The cloud platform 502 is shown to include integration middleware 1020. The integration middleware 1020 can be configured to integrate multiple components (e.g., software applications, databases, and/or the like) together. For example, a dashboard 1038 may require specific data from a database so that the dashboard 1038 can display a plot of data over time. The integration middleware 1020 can allow the dashboard 1038 to receive the data from the database.

The service bus 1024 can be configured to facilitate communications between multiple computing devices of the cloud platform 502 and/or the building 10 (e.g., the sensors 1010 and/or the actuators 1012). The service bus 1024 may enable communications between software applications via a queue, via a publish and subscribe technique, and/or direct connection between multiple software applications. The data ingestion 1022 can be configured to "ingest" data received from various data sources (e.g., from the sensors 1010, actuators 1012, dashboards 1038, and/or the like) into data storage. The data ingestion 1022 can be configured to implement continuous real-time and/or batched data ingestion and/or asynchronous data ingestion. The data ingestion 1022 can store data in various databases or file systems (e.g., the data lake 1018). The legacy data 1026 may be data that is collected via systems of the building 10 that are not currently used. However, this legacy data 1026 can be utilized to perform machine learning on historical data.

The cloud platform 502 is shown to include artificial intelligence 1028 and cognitive engines 1032. The artificial intelligence 1028 and/or cognitive engines 1032 can be configured to implement various forms of machine learning, data mining, pattern recognition, natural language processing (NLP), and/or the like. The artificial intelligence 1028 and/or the cognitive engines 1032 can be configured to generate and/or train the hybrid models 1036. In some embodiments, the hybrid models 1036 are digital twin models (e.g., the digital twin 904), and can be a model for physical device 902 (e.g., the sensors 1010 and/or the actuators 1012).

The cloud platform 502 is shown to include the notifications 1030, the visualizations 1034, and the dashboards 1038. The notifications 1030, the visualizations 1034, and/or the dashboards 1038 may be generated by the cloud platform 502 based on the hybrid models 1036 (e.g., a digital twin) or based on data received from the sensors 1010 and/or the actuators 1012. The notifications 1030, visualizations 1034, and/or the dashboards 1038 can be generated with and/or based on the data of the data lake 1018.

Figure 11A:
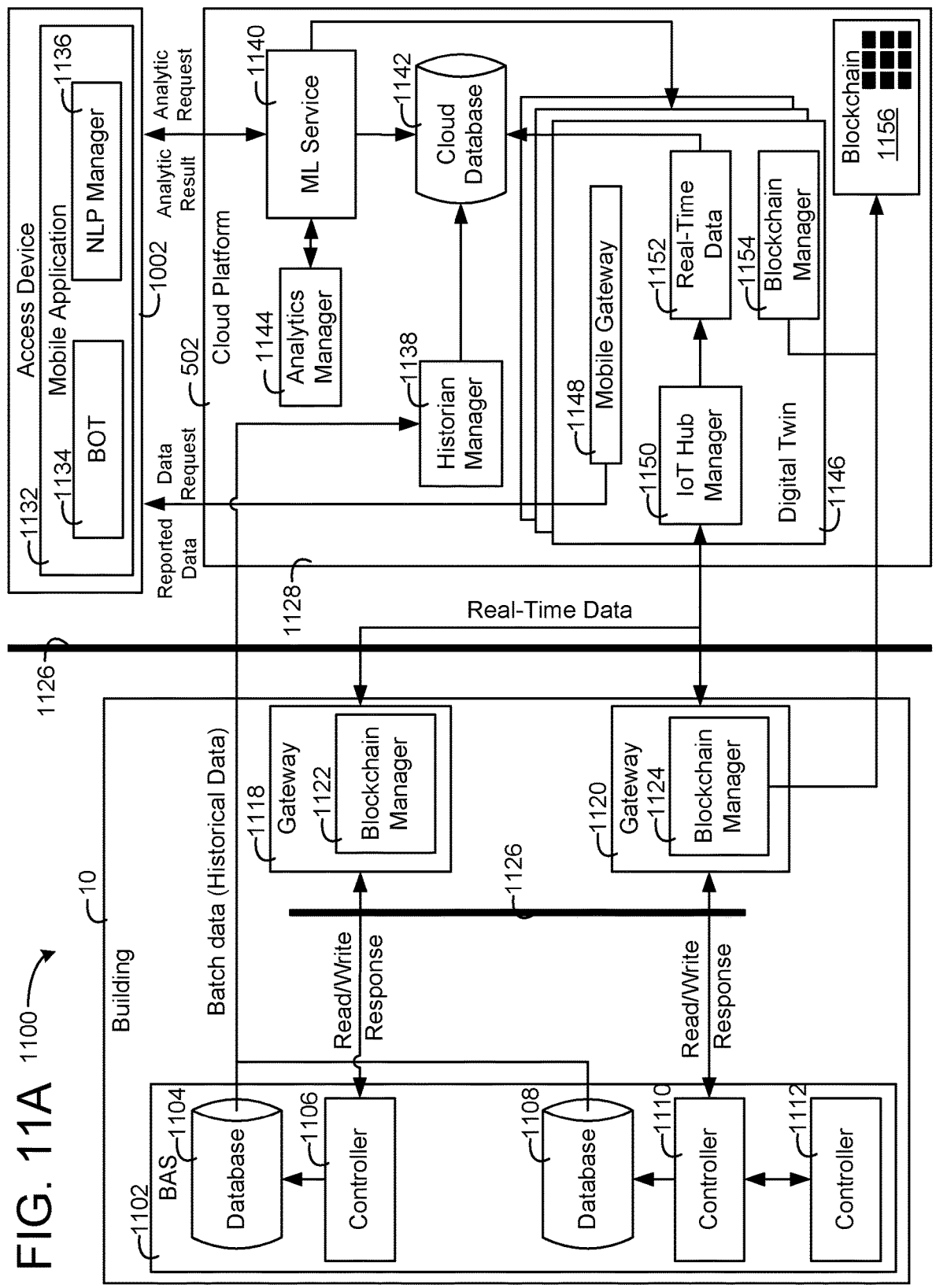
FIG. 11A is a block diagram of a building management platform system for performing digital twinning of physical devices within a building, according to some embodiments.

Referring now to FIG. 11A, a block diagram of a system 1100 for performing digital twinning of physical devices within the building 10 is shown, according to an exemplary embodiment. The system 1100 is show to include three main components, an on-premises system, an off-premises system, and an access device. The system 1100 is shown to include the building 10, the on-premises system of the building 10, namely, BAS 1102, gateway 1118, and gateway 1120, and the off-premises system, namely, the cloud platform 502 which includes the digital twins 1146. Furthermore, an access device 1002 is shown including a mobile application 1132 configured to communicate with the cloud platform 502.

On-Premises System

The on-premises system may be the systems located within the building 10. The BAS 1102 of the building 10 includes various controllers and databases for controlling the physical equipment of the building 10 (e.g., chillers, air handler units, and/or the like). The BAS 1102 is shown to include controllers 1106, 1110, and 1112 and databases 1104 and 1108. The controllers can be configured to control various pieces of equipment (e.g., an AHU, a VAV, and/or the like). The controllers 1106, 1110, and 1112 may include various HVAC or building system sensors and/or actuators that are configured to measure environmental conditions of the building 10 and to control the environmental conditions. In various embodiments, the controllers 1106, 1110, and 1112 may be supervisory controllers, such as, for example, a Network Control Engine Controller (NCE), a Network Automation Engine Controller (NAE), and/or a Field Equipment Controller (FEC). For example, in some embodiments, the controller 1106 may be a NCE controller, the controller 1108 may be a NAE controller, and the controller 1112 may be a FEC controller.

The controller 1106 can be configured to communicate with the database 1104. In various embodiments, the database 1104 may be a component of the controller 1106 or the database 1104 may be located remote from the controller 1106. The controller 1106 can be configured to store and/or retrieve data from the database 1104. For example, if the controller 1106 is a controller for an AHU, the controller 1106 can be configured to record return air temperature (RAT) in the database 1104. In this regard, the database 1104 can store time-series data of RAT values for the AHU. Similarly, the controller 1110 is shown to be associated with the database 1108, and can be configured to communicate with the database 1108. In various embodiments, the database 1108 may be a component of the controller 1110 or the database 1108 may be located remote from the controller 1110. The controller 1110 can be configured to store and/or retrieve data from the database 1108. In some embodiments, the controller 1112 may be communicatively coupled to the controller 1110, and may provide data to the controller 1110 to be stored in the database 1108.

The building 10 is shown to include a gateway 1118 and a gateway 1120. The gateways 1118 and 1120 can be associated with a specific controller of the building 10. For example, the gateway 1118 is shown to communicate with the controller 1106 while the gateway 1120 is shown to communicate with the controller 1110. In some embodiments, the gateway 1118 is a software component of the controller 1106. In some embodiments, the gateway 1118 is a module that communicates with the controller 1106. For example, the gateway 1118 may be a network gateway for the controller 1106 enabling the controller 1106 to interface with the cloud platform 502. As shown, the gateway 1118 can communicate with the controller 1106 via the network 1126. The network 1126 may be a non-IP based network, e.g., the non-IP network 604. In some embodiments, the network 1126 is an IP based network, e.g., the IP network 602.

The gateway 1118 can be configured to issue read/write commands to the controller 1106 which may in turn issue a response to the gateway 1118. As an example, the gateway 1118 may issue a parameter change (e.g., a setpoint change) to the controller 1106. In response to receiving the setpoint change write command, the controller 1106 may update its setpoint parameter and issue a response that the controller 1106 has updated the setpoint parameter. As another example, the gateway 1118 may issue a RAT read command to the controller 1106 and the controller 1106 can respond with a RAT value. The gateway 1120 can be similarly configured to perform reading and writing with the controller 1110 in a similar manner as the gateway 1118 performs reading and writing with the controller 1106.

In some embodiments, a gateway (e.g., the gateways 1118 and 1120) is added to every supervisory controller (e.g., controllers 1106 and 1108) or are software components added to the supervisory controllers for the BAS 1102. In some embodiments, the gateways 1118 and 1120 can be configured to push data from the BAS 1102 to the cloud platform 502 in real-time or near real-time. In some embodiments, a python based client can be used by the gateways 1118 and 1120 to make BACnet Read Property and BACnet Write Property. In some embodiments, a java script based node application can be used to expose the properties of each object as a URL on a local network. In some embodiments, another java script based node application can use these URL's to fetch and push data on to the IoT hub manager 1150 (e.g., an Azure IOT hub). In some embodiments, gateways 1118 and 1120 can be configured to send a request message to the controllers 1106 and/or 1110, while the controllers 1106 and/or 1110 can be configured to write received parameters of the request message to data storage of the controllers 1106 and/or 1110. Further, the controllers 1106 and/or 1110 can be configured to send a response message to the gateways 1118 and/or 1120 in response to receiving the request message from the gateways 1118 and/or 1120. An example of a request message format for reading and/or writing is shown in FIG. 18A, while a response message format is shown in FIG. 18B.

In some embodiments, the gateways 1118 and 1120 include block chain managers 1122 and 1124. The block chain managers 1122 and 1124 can be configured to allow the gateways 1118 and 1120 to write data to the block chain 1156 and/or receive data from the block chain 1156. For example, in some embodiments, block chain managers 1122 and 1124 can use the URLs generated by the java script based node of the gateways 1118 and 1120 to check if there is a change in data and to push the data to the block chain 1156. In some embodiments, to save the number of push on the IoT hub manager 1150, a change of value worker (COV) module may be utilized to push the data only when there is a change in the object's property to which the COV is subscribed. In some embodiments, writing and/or receiving data from the block chain 1156 may occur in real-time or near real-time.

In some embodiments, operating parameters for the controllers 1106 and/or 1110 are stored in the block chain 1156. In this regard, the block chain managers 1122 and/or 1124 can be configured to read the parameters from the block chain 1156. In some embodiments, the block chain 1156 stores control parameters for the controllers 1106 and/or 1110 determined by the cloud platform 502. In this regard, the cloud platform 502 can identify particular values for a control parameter for the controllers 1106 and/or 1110 and store the value for the control parameter in the block chain 1156. The control parameter may be identified by various digital twin modeling and simulation techniques described with further reference to FIGS. 13-17. Since the data stored in a block chain is immutable, the devices of system 1100 can rely on the data of the block chain since the data, once stored in the block chain, is immutable. In this regard, the gateways 1118 and 1120 can be configured, via the block chain managers 1122 and 1124, to store or retrieve data from the block chain 1156 with the assurance that the retrieved data has not been tampered with by an outside entity.

Off-Premises System

The cloud platform 502 of the off-premises system is shown to include digital twins 1146, a cloud database 1142, a machine learning (ML) service 1140, and the block chain 1156. The digital twins 1146 can be software models of physical devices of the building 10. For example, if the controller 1110 is a controller for an AHU, based on the data received from the controller 1110, the digital twin 1146 may be a digital representation of the controller 1110 and the AHU. The cloud database 1142 can be configured to store real-time data and/or historical data. A historian manager 1138 can be configured to receive historical data from the controllers 1106, 1110, and/or 1112 via the databases 1104 and/or 1108. Based on this received historical data, the historian manager 1138 can store the historical data in the cloud database 1142 for use in performing machine learning via the machine learning service 1140 or analytics by the analytics manager 1144. The digital twin 1146 is shown to include an IoT hub manager 1150. The IoT hub manager 1150 can be configured to receive and transmit real-time data 1152 to the cloud database 1142 for use in performing machine learning by the ML service 1140. In some embodiments, the cloud database 1142 can be a Structured Query Language (SQL) database (e.g., an AZURE SQL), a Map database, a key-value database, a Graph database, and/or any other suitable database.

The ML service 1140 can be configured to receive historical data and/or real-time data 1152 from the cloud database 1142 and perform machine learning on the received data to update the digital twin 1146 and/or generate insights for an end user. The ML service 1140 can be a service that generates and/or trains models (e.g., the digital twin 1146) via various machine learning models based on the data of the cloud database 1142. The models that the ML service 1140 can generate and train may model various parameters, settings, and/or the performance of a physical device (e.g., the controller 1106 and/or the controller 1110). The models may include Bayesian Models, Artificial Neural Networks, Deep Artificial Neural Networks, Support Vector Machines (SVMs), Binary Classification Models, Multiclass Classification Models, Regression Models, Decision Tree Models, and/or any other type of suitable machine learning model. In some embodiments, the machine learning service 1140 can be the Azure Machine Learning (AML) Service or AWS Machine Learning.

In some embodiments, each on-site device may be represented on the cloud platform 502 by a corresponding digital twin 1146. These digital twins 1146 receive real time data from the actual equipment (e.g., controllers, sensors, and/or actuators) in the field and store the data to the cloud database 1142. The request from users for carrying out any predictions (based on insights) are requested to the corresponding digital twin, which in turn commands to the ML service 1140 to perform the necessary steps corresponding to the prediction.

The cloud platform 502 is shown to include the block chain 1156. In some embodiments, the block chain 1156 is a Block chain As A Service (BAAS), for example, such as MICROSOFT AZURE Ethereum Block chain, DELOITTE Rubix block chain, IBM Bluemix block chain, and/or any other suitable BAAS. The block chain 1156 is configured to secure data using block chain technology. For example, controller parameters, firmware, equipment settings, and/or the like can be stored in the block chain 1156 so that the data can be verified. Furthermore, the real-time data 1152 and/or the historical data can be transmitted between the devices of the building 10 and the cloud platform 502 via block chain 1156. For example, the block chain manager 1124 can store the real-time data 1152 or the historical data of the controller 1110 and/or 1112 in the block chain 1156 from which the cloud platform 502 (e.g., the block chain manager 1154) can retrieve the data.

Since the devices of the system 1100 can communicate via the Internet (e.g., the network 1126), communicated data can be compromised or manipulated by an outside entity. To prevent data from being manipulated or compromised, the devices of the system 1100 can be configured to add information (e.g., settings, network configurations, and/or the like) to the block chain 1156 for secure, immutable data storage. For example, information for the digital twin 1146 can be stored in the block chain 1156 by the cloud platform 502. Furthermore, the gateways 1118 and 1120 can be configured to store information for the controllers 1106, 1110, and 1112, and/or the gateways 1118 and 1120 in the block chain 1156.

Before issuing a command to the gateways 1118 and/or 1120 for the controllers 1106, 1110, and/or 1112, the block chain manager 1154 can be configured to identify whether any parameter changes have been manipulated. For example, the digital twin 1146 can compare its model to a model stored in the block chain 1156 to verify that the models are the same. Similarly, the block chain manager 1154 can be configured to compare stored parameters of the controllers 1106, 1110, and/or 1112 against corresponding parameters stored in the block chain 1156. If no parameters have been changed, the command is issued. However, if there has been a change, then the block chain manager 1154 can be configured to generate an alarm and transmit the alarm to a master system (e.g., a BMS) indicating that a device has been compromised. In some embodiments, the block chain 1156 can be used to implement smart contracts for the devices and secure transactions to lower level devices.

Access Device

Still referring to FIG. 11A, the mobile application 1132 can be configured to receive analytics data from the cloud platform 502 and display the analytics data on the access device 1002. The mobile application 1132 can be configured to provide dashboards including analytics information and visualizations of the digital twin 1146 and can display this information to the end user via the access device 1002. Furthermore, the mobile application 1132 can be configured to allow the access device 1002 to interact with the digital twin 1146. The mobile application 1132 can be configured to receive equipment parameter prediction input for generating equipment parameter predictions via the mobile application 1132. The mobile application 1132 can provide the inputs to the cloud platform 502 to generate equipment predictions.

Various views (e.g., three dimensional simulations, dashboards, reports, etc.) can be provided to the user of the access device 1002 via the mobile application 1132. For example, the user can navigate to a site where the cloud platform 502 can generate the various views, locate the equipment desired to be viewed, and view the equipment's digital twin. Furthermore, the user can command various parameters of the equipment represented by the digital twin, and can also request parameter predictions which the cloud platform 502 can generate via the digital twin 1146.

Figure 11B:
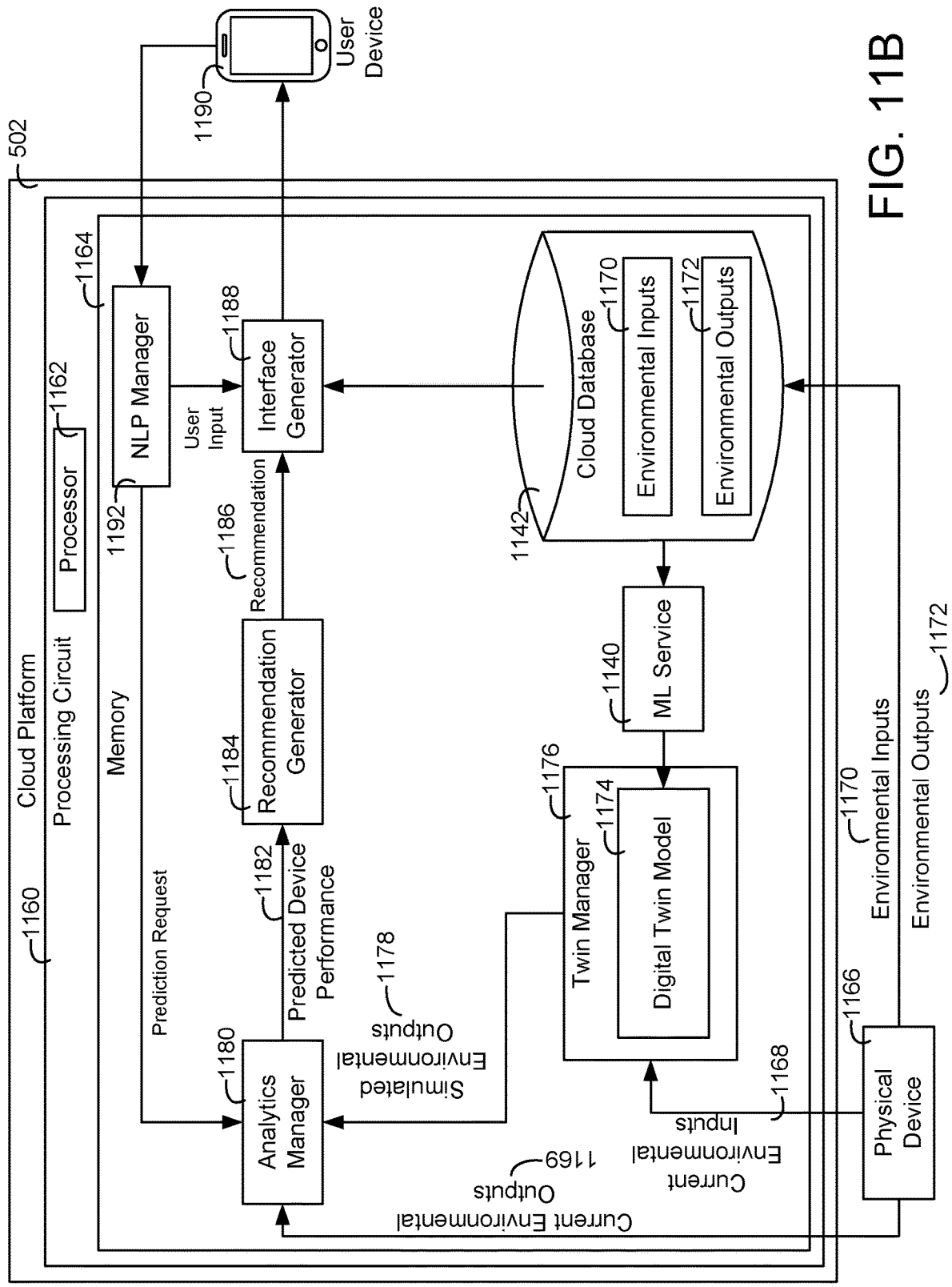
FIG. 11B is a block diagram illustrating the cloud platform of FIG. 11A in greater detail.

Referring now to FIG. 11B, a block diagram illustrating the cloud platform 502 in greater detail is shown, according to an exemplary embodiment. The cloud platform 502 is shown to include a processing circuit 1160. In some embodiments, the cloud platform 502 includes one processing circuit (e.g., the processing circuit 1160) or multiple processing circuits. For example, the cloud platform 502 may be a server or a group of servers including multiple processing circuits configured to work together to perform the functionality shown and described herein. The processing circuit 1160 may be the same as or similar to the processing circuit 404 described with reference to FIG. 4. The processing circuit 1160 is shown to include a processor 1162 and memory 1164. The processor 1162 and the memory 1164 may be the same as or similar to the processor 406 and the memory 408 described with reference to FIG. 4.

The memory 1164 is shown to include various components. The components can include software modules, data elements, software functions, and/or any other piece of code or data. The memory 1164 is shown to receive current environmental inputs 1168. The cloud platform 502 can be configured to receive the current environmental inputs 1168 from a physical device 1166. The current environmental inputs 1168 may be the same as or similar to the real-time data 1152 received from the controllers 1106, 1110, and/or 1112 via the gateways 1118 and/or 1120. In this regard, the physical device 1166 may be the controllers 1106, 1110, and/or 1112, may be a physical device associated with the controllers 1106, 1110, and/or 1112, or may be any other suitable device (e.g., any of the BMS devices described with reference to FIGS. 1-4).

The memory 1164 is shown to include the cloud database 1142 as described with further reference to FIG. 11A. The cloud database 1142 is shown to include environmental inputs 1170 and environmental outputs 1172. The environmental inputs 1170 and/or outputs 1172 can be received from the physical device 1166 (or from a gateway which services the physical device 1166). Based on the data of the cloud database 1142, the ML service 1140 can be configured to generate and train the digital twin model 1174. The ML service 1140 can be configured to use Bayesian model training algorithms, Neural Network training algorithms, and/or any other type of suitable training algorithm to generate the digital twin model 1174. In some embodiments, the ML service 1140 uses a regression training algorithm, such as a decision forest regression training algorithm, for example.

The memory 1164 is shown to include a twin manager 1176. The twin manager 1176 can be configured to manage the digital twin model 1174 and/or any other digital twin models. The twin manager 1176 can be configured to receive the current environmental inputs 1168 from the physical device 1166. The twin manager 1176 can be configured to generate simulated environmental outputs 1178 based on the digital twin model 1174 and the current environmental inputs 1168. The simulated environmental outputs 1178 can be provided by the twin manager 1176 to a analytics manager 1180 as shown to be included the memory 1164.

The analytics manager 1180 is shown to receive the simulated environmental outputs 1178 and the current environmental outputs 1169, and can generate the predicted device performance 1182 based on the current environmental outputs 1169 and the simulated environmental outputs 1178. The analytics manager 1180 can be configured to perform comparisons between the simulated environmental outputs 1178 and the current environmental outputs 1169 to identify how the physical device 1166 is performing with respect to the digital twin model 1174. In some embodiments, the analytics manager 1180 can analyze the simulated environmental outputs 1178 and/or the current environmental outputs 1169 to identify whether the performance of the physical device 1166 is deteriorating. Deteriorating performance may indicate that the physical device 1166 is not operating properly, whether maintenance should be performed on the physical device 1166 prior to a fault occurring, whether the physical device 1166 is experiencing a fault, whether operating parameters of the physical device 1166 should be updated or adjusted to improve the performance of the physical device 1166, and/or the like.

The recommendation generator 1184 can be configured to generate a recommendation 1186 based on the predicted device performance 1182. For example, if the predicted device performance 1182 is indicative of the physical device 1166 deteriorating or failing in the future, then the recommendation 1186 generated by the recommendation generator 1184 may indicate that maintenance should be performed on the physical device 1166 to prevent or reduce a chance of the physical device 1166 from failing. In some embodiments, the recommendation 1186 is to adjust future designs of the physical device 1166. The recommendation 1186 may indicate that certain components or features of the physical device 1166 may need improvement in the future and/or may recommend various changes that could be made to the design of the physical device 1166 that would improve the physical device 1166. Furthermore, in some embodiments, the recommendation generator 1184 can generate a recommendation 1186 that includes a predicted trend of environmental outputs. For example, the recommendation 1186 may illustrate a trend of the simulated environmental outputs. An exemplary trend is shown in greater detail in FIG. 24.

Based on the recommendation 1186 generated by the recommendation generator 1184, the interface generator 1188 can be configured to generate an interface and cause the interface to be displayed on a display device of user device 1190. The interface generator 1188 is shown to receive user input from a natural language processing (NLP) manager 1192, the recommendation 1186 from the recommendation generator 1184, and data (e.g., the environmental inputs 1170, the environmental outputs 1172, and/or the like) from the cloud database 1142. Based on this received information, the interface generator 1188 can generate one or more interfaces for the user device 1190.

For example, the interface generator 1188 can be configured to generate three dimensional representations of the physical device 1166 and/or the building (e.g., the building 10) that the physical device 1166 is located within. The various environmental inputs or outputs of the physical device 1166 may be stored in the cloud database 1142. Therefore, the interface generator 1188 can be configured to include an indication of the current values of the environmental inputs and outputs in the three dimensional representation. Furthermore, various recommendation based interfaces can be generated by the interface generator 1188.

For example, the recommendation 1186 may be a recommendation to perform maintenance on the physical device 1166 before the physical device 1166 experiences a fault. In this regard, the interface generator 1188 can generate an interface that indicates that the physical device 1166 may experience a fault and may indicate the rationale behind the determination, for example, "RAT values have been unusually low in the past week" or any other indication. In some embodiments, the user of the user device 1190 can interact with the interfaces via a natural language input (e.g., spoken words, entered text, etc.). In this regard, the interface generator 1188 can receive various user inputs for navigating the interfaces generated by the interface generator 1188 via natural language user inputs.

The memory 1164 is shown to include the NLP manager 1192. The NLP manager 1192 can be configured to receive natural language input and generate user inputs provided to the interface generator 1188 or prediction requests provided to the analytics manager 1180. The NLP manager 1192 can be configured to receive audio data of spoken natural language by the user of the user device 1190 and translate the spoken words into discrete commands (e.g., user input commands and/or prediction request commands). Furthermore, the NLP manager 1192 can receive written natural language inputs from the user device 1190 and generate the commands based on the written words. The natural language inputs may be inputs such as, for example, "I would like to see a prediction for the physical device" or "Let me see how the physical device will perform in the future." Both NLP inputs could be mapped by the NLP manager 1192 to a prediction request command provided to the analytics manager 1180. In response to receiving the prediction request command from the NLP manager 1192, the analytics manager 1180 can generate the predicted device performance 1182 so that a prediction can be provided to the user device 1190.

Figure 12:
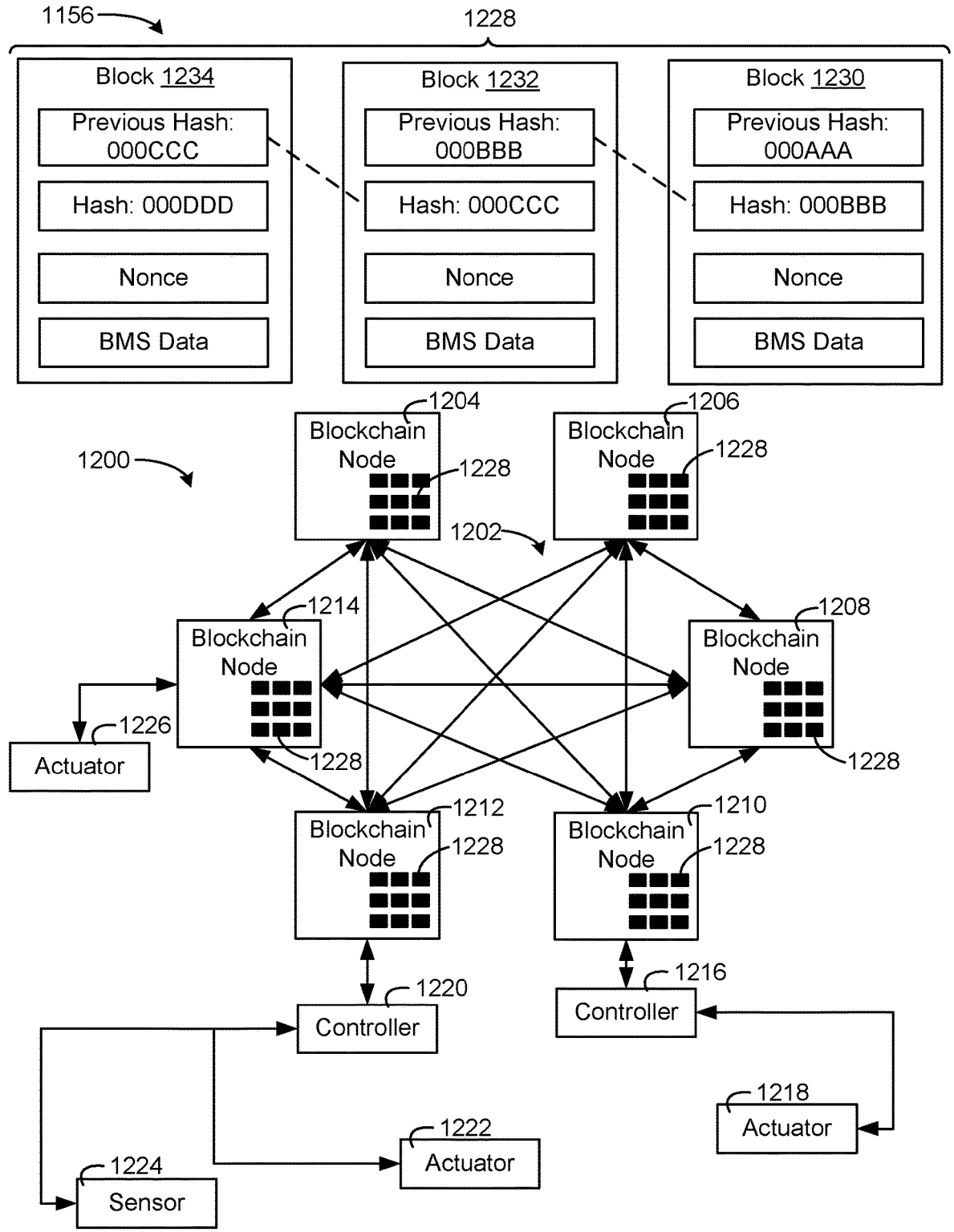
FIG. 12 is a block diagram of a block chain system, according to some embodiments.

Referring now to FIG. 12, a system 1200 of block chain nodes 1204-1214 communicating via a network 1202 is shown, according to some embodiments. The network 1202 maybe the same as or similar to the network 602 and/or 604 as described with reference to FIGS. 6 and 7. There can be any number of block chain nodes 1204-1214 in the system 1200, and in some embodiments, the number is dynamic and can change over time. The block chain nodes 1204-1214 can be any suitable server, computer, controller, actuator, or sensor that can communicate via the network 1202. In some embodiments, the block chain nodes 1204-1214 are building gateways (e.g., gateway 1118 and the gateway 1120), Network Automation Engines (NAEs), Network Integration Engines (NIEs), Field Equipment Controllers (FECs), and/or various other building devices or building controllers. The block chain nodes 1204-1214 can be the devices of smart connected things 514 and/or cloud platform 502 as described with reference to FIG. 5. In some embodiments, block chain nodes 1204-1214 are the VAV units 116, the AHU 106, the chiller 102, and/or the boiler 104 as described with reference to FIG. 1.

In some embodiments, block chain nodes 1204-1214 are located in a single building, multiple buildings, multiple cities, and/or multiple countries. In some embodiments, some and/or all of the block chain nodes 1204-1214 can be located in a particular building and/or building zone. In some embodiments, some and/or all of block chain nodes 1204-1214 are located in building 10 as described with reference to FIG. 1. In some embodiments, each of the block chain nodes 1204-1214 and the devices connected to them are located in a particular zone of building 10. In various embodiments, some and/or all of block chain nodes 1204-1214 and/or the devices connected to them are configured to control the environmental conditions of a particular building and/or building zone. The block chain nodes 1204-1214 can be configured to communicate with each other via the network 1202. The network 1202 can be any kind of network, such as the Internet, TCP/IP, Ethernet, LAN, WAN, Wi-Fi, Zigbee, BACnet, 3G, LTE, Li-Fi, and/or any combination thereof.

The block chain nodes 1210-1214 are shown to be connected to various sensors, actuators, and controllers. The block chain node 1210 is shown to be connected to controller 1216 and actuator 1218 via the controller 1216. The block chain node 1212 is shown to be connected to a controller 1220 and actuator 1222 and sensor 1224 via the controller 1220. The block chain node 1214 is shown to be connected to an actuator 1226. The controller 1216 and/or the controller 1220 can be the same as or similar to the controller 1106, the controller 1110, the controller 1112, the controllers 520, and/or the IP controller 530. Similarly, the sensor 1224 can be the same as or similar to the sensors 516 and/or the IP sensors 526. Further, the actuator 1226, the actuator 1222, and/or the actuator 1218 can be similar to and/or the same as the actuators 518 and/or the IP actuators 528.

The block chain nodes 1204-1214 are shown to each include a block chain 1228. The block chain 1228 can be a chain of one or more data blocks where each data block is linked to a previous block, thus, forming a chain. The chain may be a chain of sequentially ordered blocks. The block chain nodes 1204-1214 can exchange building data that they collect via controller 1216, controller 1220, actuator 1218, actuator 1222, sensor 1224, and/or actuator 1226 via the block chain 1228.

The block chain 1228 can include any number of blocks and new blocks can be added to block chain 1228 by the block chain nodes 1204-1214. Three blocks of the block chain 1228 are shown in FIG. 12, block 1234, block 1232, and block 1230. Each block is shown to include a nonce, BMS data, a hash, and a previous hash of the previous block in the chain. The block chain 1228 is illustrated right to left, that is, the rightmost block 1230 is the oldest block shown in FIG. 12 while the leftmost block 1234 is the newest block shown in FIG. 12. The BMS data of each block can be contracts, transactions, data, licenses, access control, configuration settings, and/or any other information. The block chain 1228 can include configuration data for the block chain nodes 1204-1214. The block chain 1228 may be a public or private block chain. If one of block chain nodes 1204 goes offline, any of the other block chain nodes 1204-1214 can retrieve information for the offline block chain node from the block chain 1228, and can take over the responsibilities of the offline block chain node since any information needed to take over may be available in the block chain 1228 of all the block chain nodes 1204-1214.

Blocks 1230-1234 are each shown to include a nonce value. The nonce value can be a value that when hashed with the BMS data of the block and the previous hash, in addition to other information, results in a hash that meets a difficulty requirement. In FIG. 12, the difficulty requirement is that the first three values of each hash are zeros. If the hash is considered as a hexadecimal number, the difficulty requirement can be understood as a value that a valid hash must be less than. Any of the block chain nodes 1204-1214 can attempt to generate a block with a hash value that meets the difficulty requirement. In some embodiments, some and/or all of block chain nodes 1204-1214 work on generating a hash value for a new block to be added to block chain 1228. If one of the block chain nodes 1204-1214 generates a hash that meets the difficulty requirement, that block chain node can add the block to block chain 1228, and can notify the other block chain nodes 1204-1214 of the solved block so that the other block chain nodes 1204-1214 can also add the solved block to the block chain 1228 that they store.

In some embodiments, the blocks of the block chain 1228 make up a record of data for a building and/or for various devices. For example, the blocks of the block chain 1228 may each include BMS data (e.g., HVAC data) associated with the building. Each block may store BMS data of a particular device of the system 1200. Together, in block chain 1228, the blocks may make up a record of all the BMS data associated with the building. In another example, the blocks each include information pertaining to licensing information for the physical devices (e.g., BMS devices). Further details regarding block chain that can be implemented by the systems and methods discussed herein can be found in U.S. patent application Ser. No. 15/592,041, filed on May 10, 2017, the entire disclosure of which is incorporated by reference herein.

Figure 13:
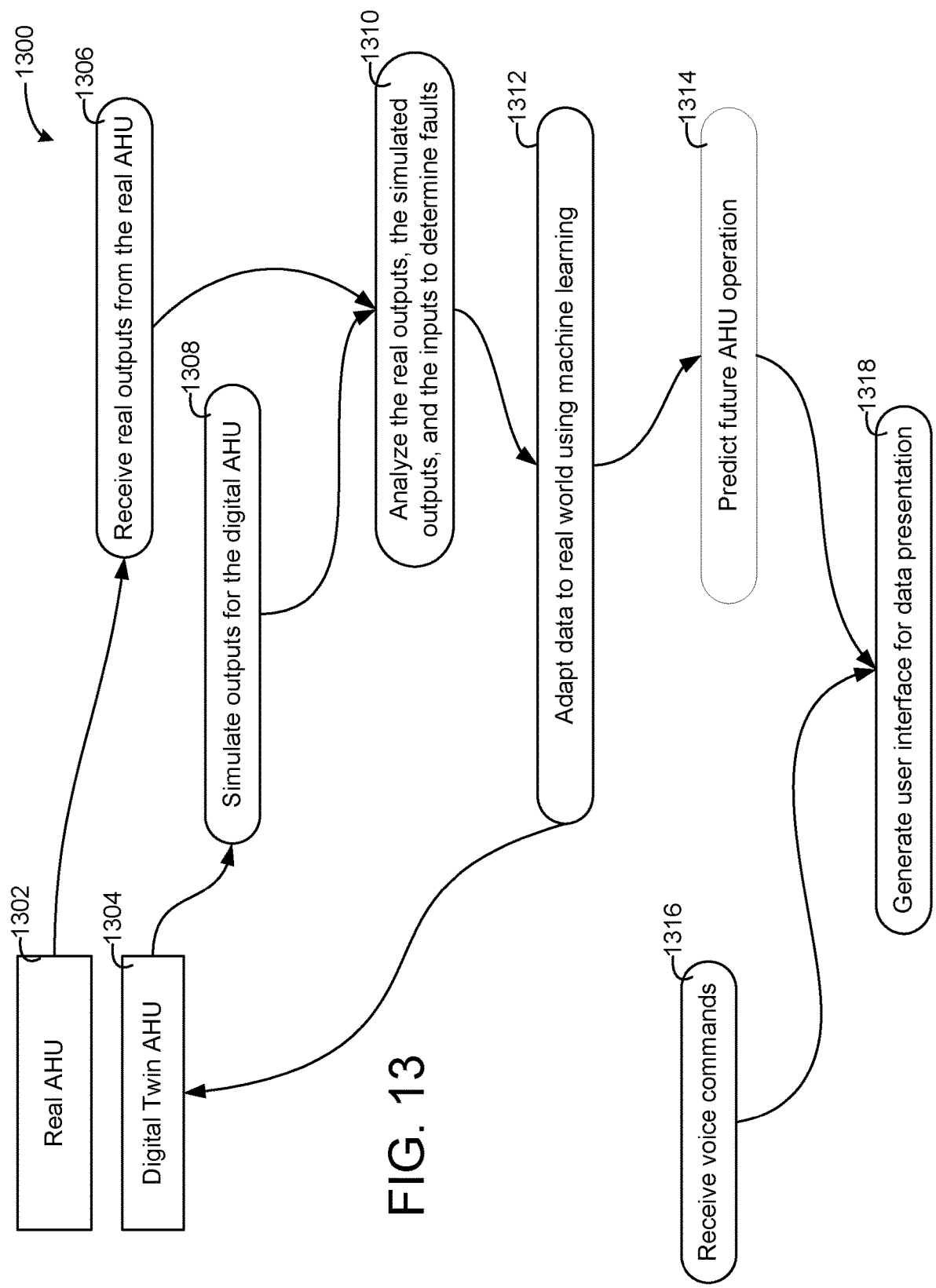
FIG. 13 is a flow diagram of a process of generating a recommendation or prediction, according to some embodiments.

FIG. 13 is a flow diagram of a process of generating a recommendation or prediction, according to an exemplary embodiment. In FIG. 13, a physical device is shown to be an AHU (i.e., real AHU 1302), but the present disclosure is not limited thereto, and it should be appreciated that the physical device may be any suitable device, such as those described with reference to FIGS. 1-12 (e.g., any of the BMS devices, controllers, sensors, actuators, or the like). Referring to FIGS. 11A through 13, the real AHU 1302 collects environmental data and sends the environmental data to the cloud platform 502. In addition, a digital twin AHU 1304 representing the real AHU 1302 simulates environmental outputs 1308 based on the digital twin model 1174 as described with reference to FIG. 11B and the environmental data collected by the real AHU 1302. In some embodiments, the real and/or simulated outputs from the real AHU 1302 and digital twin AHU 1304 are transmitted to and received by the cloud platform 502 via a block chain as discussed with reference to FIG. 12.

The real and simulated outputs are analyzed 1310 by the analytics manager 1180 to determine whether there are any faults or potential faults, and the outputs are adapted 1312 to the real world using machine learning to update the digital twin AHU 1304 and/or to generate a prediction or recommendation (i.e., predict a future AHU operation1314) using machine learning. In some embodiments, the digital twin AHU 1304 is updated via the block chain as discussed with reference to FIG. 12. When the cloud platform 502 receives a voice command (or text command) 1316 via the user device 1190, the NLP manager 1192 sends a request to the analytics manager 1180 to generate a prediction and/or recommendation (i.e., predict the future AHU operation 1314), and the recommendation generator 1184 generates a recommendation 1186 for the future AHU operation 1314. The recommendation 1186 is provided to the interface generator 1188 and a user interface is generated 1318 to present the data and/or recommendation 1186 to the user via the user device 1190.

Figure 14A:
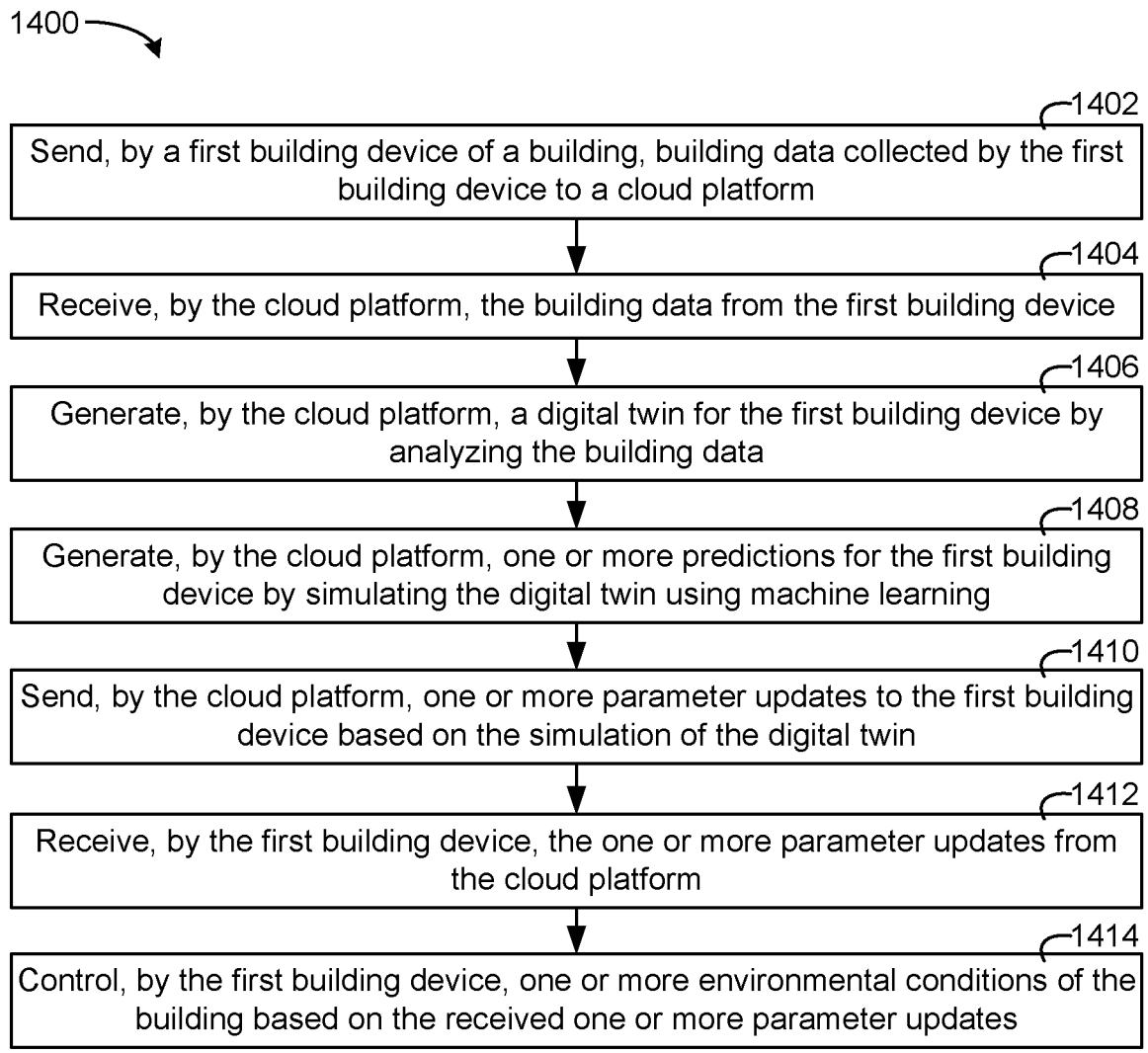
FIG. 14A is a flow diagram of a process of controlling a building device through a digital twin, according to some embodiments.

Referring now to FIG. 14A, a flow diagram of a process 1400 of controlling a building device through a digital twin is shown, according to an exemplary embodiment. In some embodiments, a first building device of a building (e.g., the building 10) collects building data. For example the first building device collects building data via sensors, actuators, and/or the like. The first building device sends the building data to a cloud platform at block 1402. For example, the cloud platform may be the cloud platform 502 as described with reference to FIGS. 5-6, 8, 19, and 11A-11B. The cloud platform receives the building data at block 1404, and generates a digital twin for the first building device by analyzing the building data at block 1406. For example, in various embodiments, the cloud platform may analyze the building data based on machine learning, such as decision forest training algorithms, Bayesian model training algorithms, Neural Network training algorithms, and/or any other type of suitable training algorithms, various specifications for the first building device, and/or user defined models for the first building device.

In some embodiments, the cloud platform may generate one or more predictions for the first building device by simulating the digital twin using machine learning at block 1408. For example, in some embodiments, the cloud platform may perform machine learning on the building data to train and/or update the digital twin based on various machine learning models, for example, such as Bayesian Models, Artificial Neural Networks, Deep Artificial Neural Networks, Support Vector Machines (SVMs), Binary Classification Models, Multiclass Classification Models, Regression Models, Decision Tree Models, and/or any other type of suitable machine learning model. In some embodiments, the machine learning models include a decision forest regression training model, for example. Thus, the digital twin relies on the data from the first building device to understand what is happening in the first building device in real-time or near real-time. In some embodiments, the cloud platform may send the one or more parameter updates to the first building device based on the simulation of the digital twin at block 1410. The first building device may receive the one or more parameter updates from the cloud platform at block 1412, and may control one or more environmental conditions of the building based on the one or more parameter updates at block 1414.

Figure 14B:
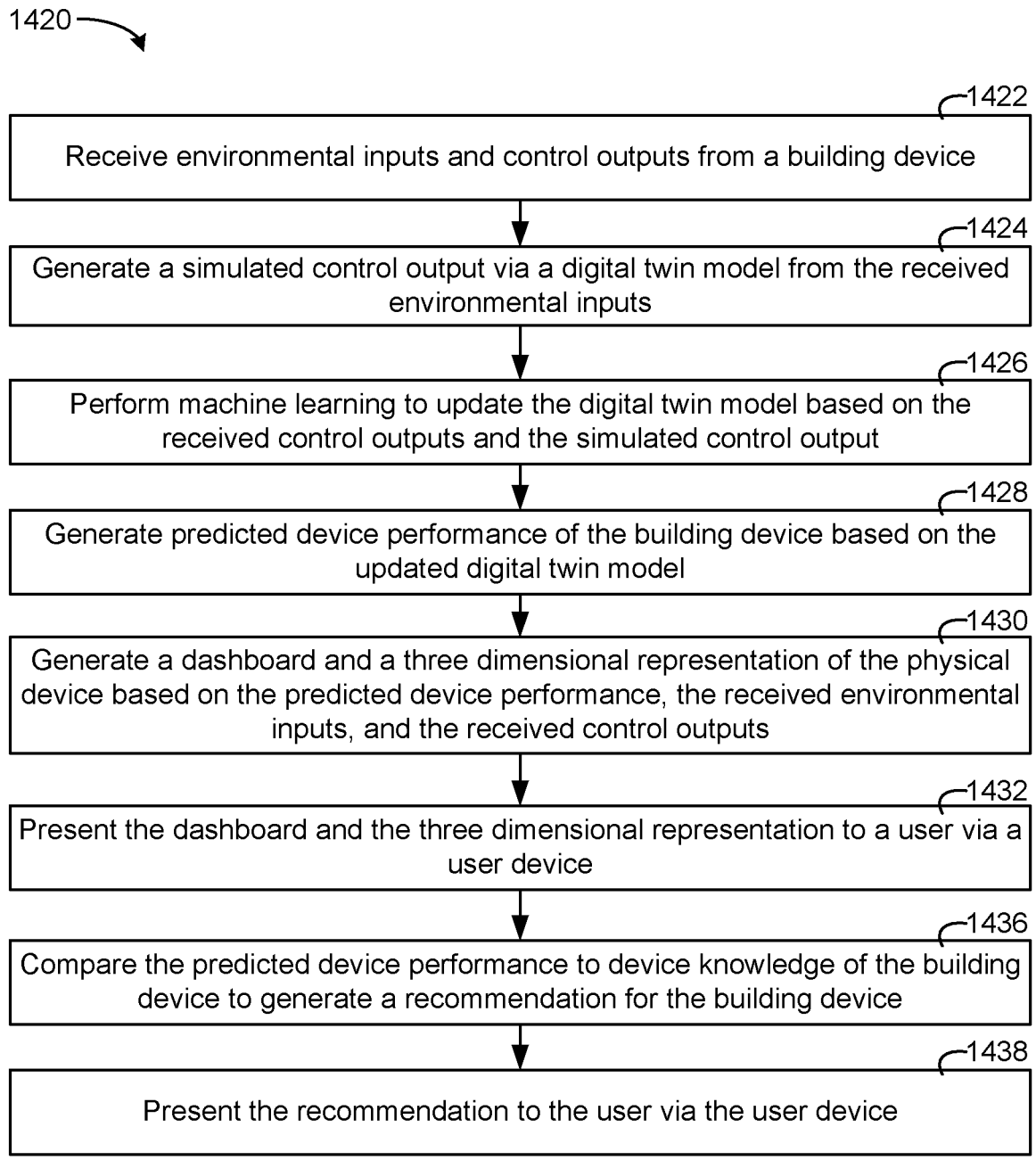
FIG. 14B is a flow diagram of a process for presenting an interface to a user based on a digital twin simulation, according to some embodiments.

Referring now to FIG. 14B, a flow diagram of a process 1420 for presenting an interface to a user based on a digital twin simulation is shown, according to an exemplary embodiment. In some embodiments, a building device of a building (e.g., the building 10) collects building data. For example the building device collects environmental inputs via sensors, actuators, and/or the like, and generates control outputs (e.g., temperature setpoint, damper position, and/or the like) to control environmental attributes (e.g., temperature, humidity, and/or the like) in response to the environmental inputs. The building device sends the environmental inputs and control outputs to a cloud platform, and the cloud platform receives this data at block 1422. For example, the cloud platform may be the cloud platform 502 as described with reference to FIGS. 5-6, 8, 19, and 11A-11B.

The cloud platform generates a simulated control output via a digital twin model based on the received environmental inputs at block 1424. In some embodiments, the cloud platform updates the digital twin model based on the received control outputs and the simulated control output via machine learning at block 1426. For example, in some embodiments, the cloud platform may perform machine learning on the received data to train and/or update the digital twin model based on various machine learning models, for example, such as Bayesian Models, Artificial Neural Networks, Deep Artificial Neural Networks, Support Vector Machines (SVMs), Binary Classification Models, Multiclass Classification Models, Regression Models, Decision Tree Models, and/or any other type of suitable machine learning model. In some embodiments, the machine learning models include a decision forest regression training model, for example.

In some embodiments, the cloud platform may generate predicted device performance of the building device based on the updated digital twin model at block 1428. For example, in some embodiments, the analytics manager 1180 can compare the simulated control outputs with the received environmental outputs to identify whether the performance of the building device is deteriorating. In some embodiments, the cloud platform (e.g., via the interface generator 1188) can generate an interface such as a dashboard with a three dimensional representation of the physical device based on the predicted device performance, the received environmental inputs, and the received control outputs at block 1430. The cloud platform can present the interface to a user via a user device (e.g., the user device 1190) at block 1432.

Further, in some embodiments, the cloud platform (e.g., via the recommendation generator 1184) can compare the predicted device performance to device knowledge of the building device to generate a recommendation for the building device at block 1436. For example, if the predicted device performance indicates that the building device is deteriorating or may fail in the future, then the recommendation generated at block 1436 may indicate that maintenance should be performed on the building device to prevent or reduce a chance of the building device from failing. The recommendation is then presented to the user via the user device at block 1438.

Figure 14C:
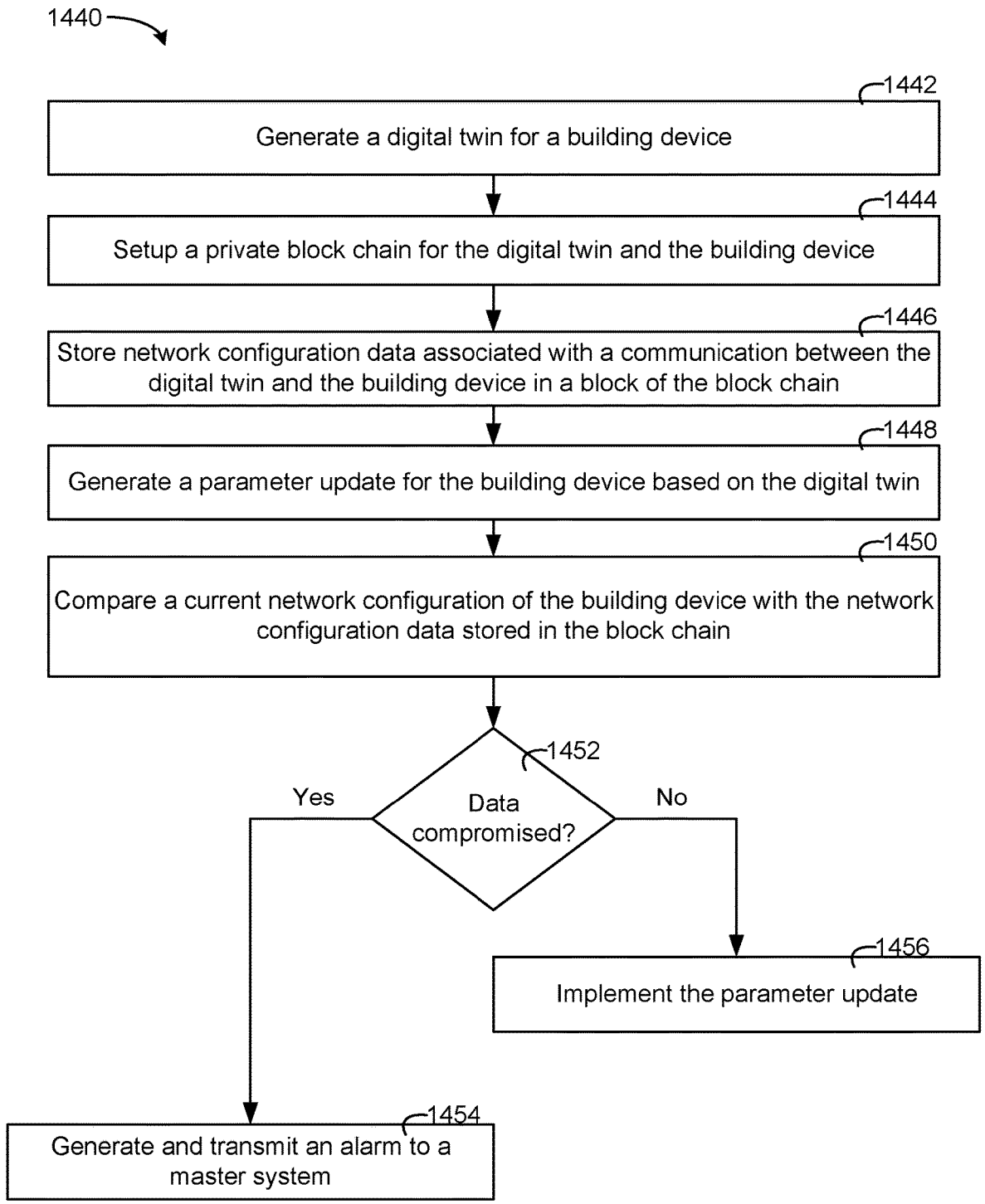
FIG. 14C is a flow diagram of a process for securing communications between a digital twin and a cloud platform, according to some embodiments.

Referring now to FIG. 14C, a flow diagram of a process 1440 for securing communications between a digital twin and a cloud platform is shown, according to an exemplary embodiment. In some embodiments, a digital twin of a building device may be generated by the cloud platform at block 1442. For example the digital twin may be generated based on environmental inputs and control outputs of the building device, machine learning to learn environmental conditions of the building device and to update the digital twin based on the learned environmental conditions, various specifications for the first building device, and/or user defined models for the first building device.

In some embodiments, the cloud platform (e.g., via block chain 1156) setups a private block chain for the digital twin and the building device at block 1444. For example, the private block chain may be a Block chain As A Service (BAAS), for example, such as MICROSOFT AZURE Ethereum Block chain, DELOITTE Rubix block chain, IBM Bluemix block chain, and/or any other suitable BAAS. In some embodiments, the private block chain secures data storage for the device and corresponding digital twin. For example, in some embodiments, the cloud platform stores network configuration data associated with a communication between the digital twin and the building device in a block of the block chain at block 1446. Because any data added to a block chain is immutable, the data cannot be changed or deleted so that unauthorized access or compromised data can be easily detected.

In some embodiments, the cloud platform generates a parameter updated for the building device based on the digital twin at block 1448. For example, based on a recommendation generated by the recommendation generator 1184, some parameters of the building device may need be tuned or changed. In this case, cloud platform compares the current network configuration of the building device with the network configuration data stored in the block chain at block 1450 to determine if the network configuration of the building device has been compromised at block 1452. In this case, if the network configuration of the building device is different from the network configuration data stored in the block chain, then the data may have been compromised, and thus, the cloud platform generates and transmits an alarm to a master system (e.g., a BMS) at block 1454. On the other hand, if the network configuration of the building device matches the network configuration data stored in the block chain, the cloud platform transmits the parameter update to the building device at block 1456, so that the building device can implement the parameter update.

Figure 14D:
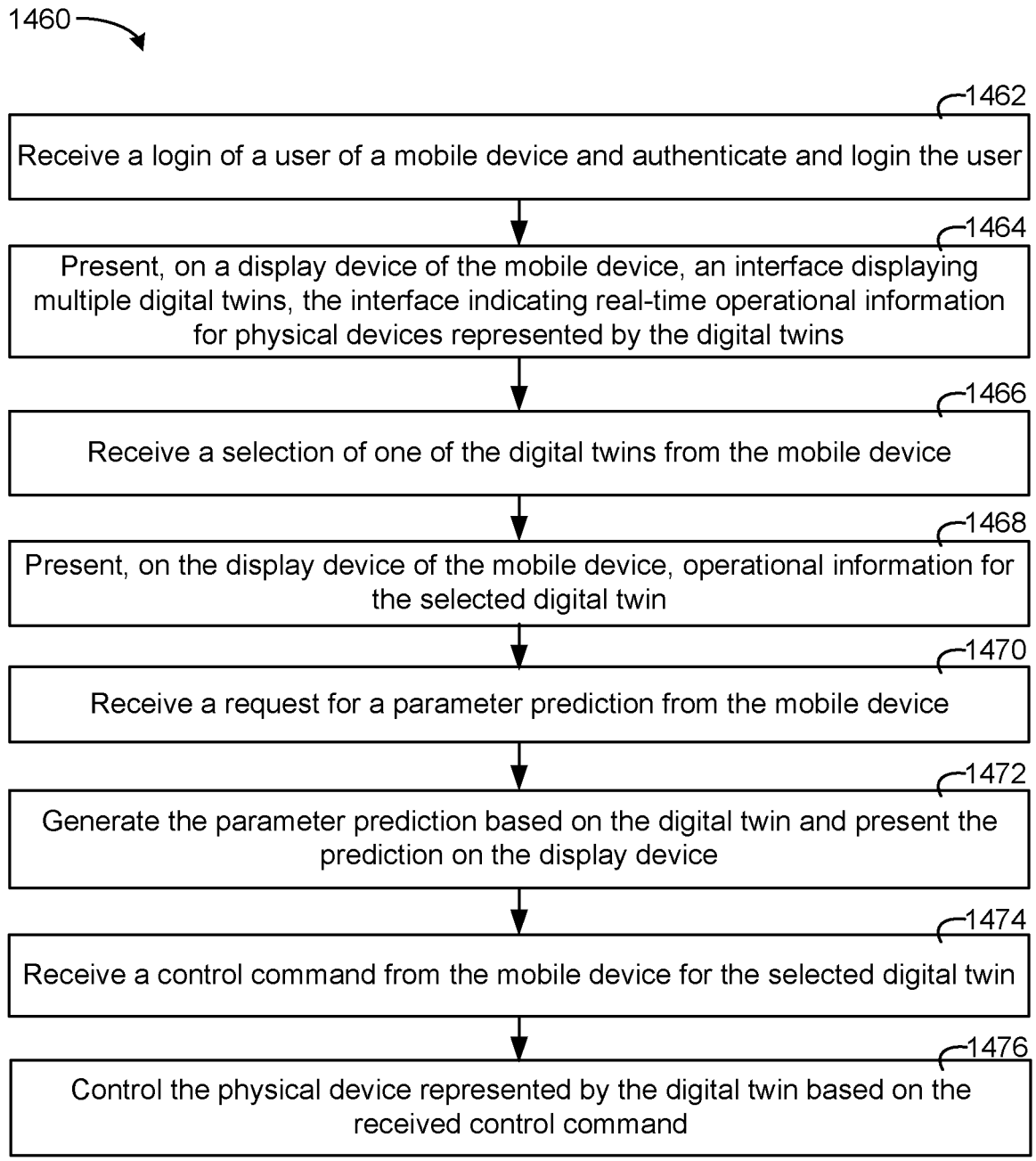
FIG. 14D is a flow diagram of a process for remotely controlling a building device from a mobile device through a digital twin, according to some embodiments.

Referring to FIG. 14D, a flow diagram of a process 1460 for remotely controlling a building device from a mobile device through a digital twin is shown, according to an exemplary embodiment. In some embodiments, a user of the mobile device (e.g., the user device 1190 or access device 1002) may invoke a web service of the cloud platform via an application or a web browser to remotely access the building device via its digital twin. In this case, the user may be prompted to enter login information (e.g., a username and password) in order to show that the user is authorized to access the building device. The cloud platform receives the login information and authenticates the login information at block 1462. If the user is authorized to access one or more building devices, the user is presented an interface via the user device displaying one or more digital twins representing real-time or near real-time operational information for one or more physical devices at block 1464.

In some embodiments, the user can interact with the interface via the mobile device to select one of the digital twins, and the cloud platform receives the selection at block 1466. In response to the selection, the cloud platform presents operational information for the selected digital twin via the display device of the mobile device. In some embodiments, the user can request via the interface on the mobile device a request for a parameter prediction for the physical device represented by the selected digital twin, and the cloud platform receives the request at block 1470. The cloud platform can then generate (e.g., via the analytics manager 1180 and/or recommendation generator 1184) the parameter prediction based on the selected digital twin and present the prediction on the display device at block 1472.

If the user decides to make changes to the physical device based on the prediction, the user can control the physical device from the mobile device via the interface. In this case, the cloud platform receives the control command from the mobile device for the selected digital twin corresponding to the physical device. In some embodiments, the cloud platform can compare the network configuration of the physical device with network configuration data stored in the block chain 1156 as discussed with reference to FIGS. 11A and 14C to determine if the data has been compromised. If the data has not been compromised, the cloud platform can send the control command to the physical device to control the physical device represented by the selected digital twin based on the received control command at block 1476.

Use Cases and Experimental Results

Figure 15:
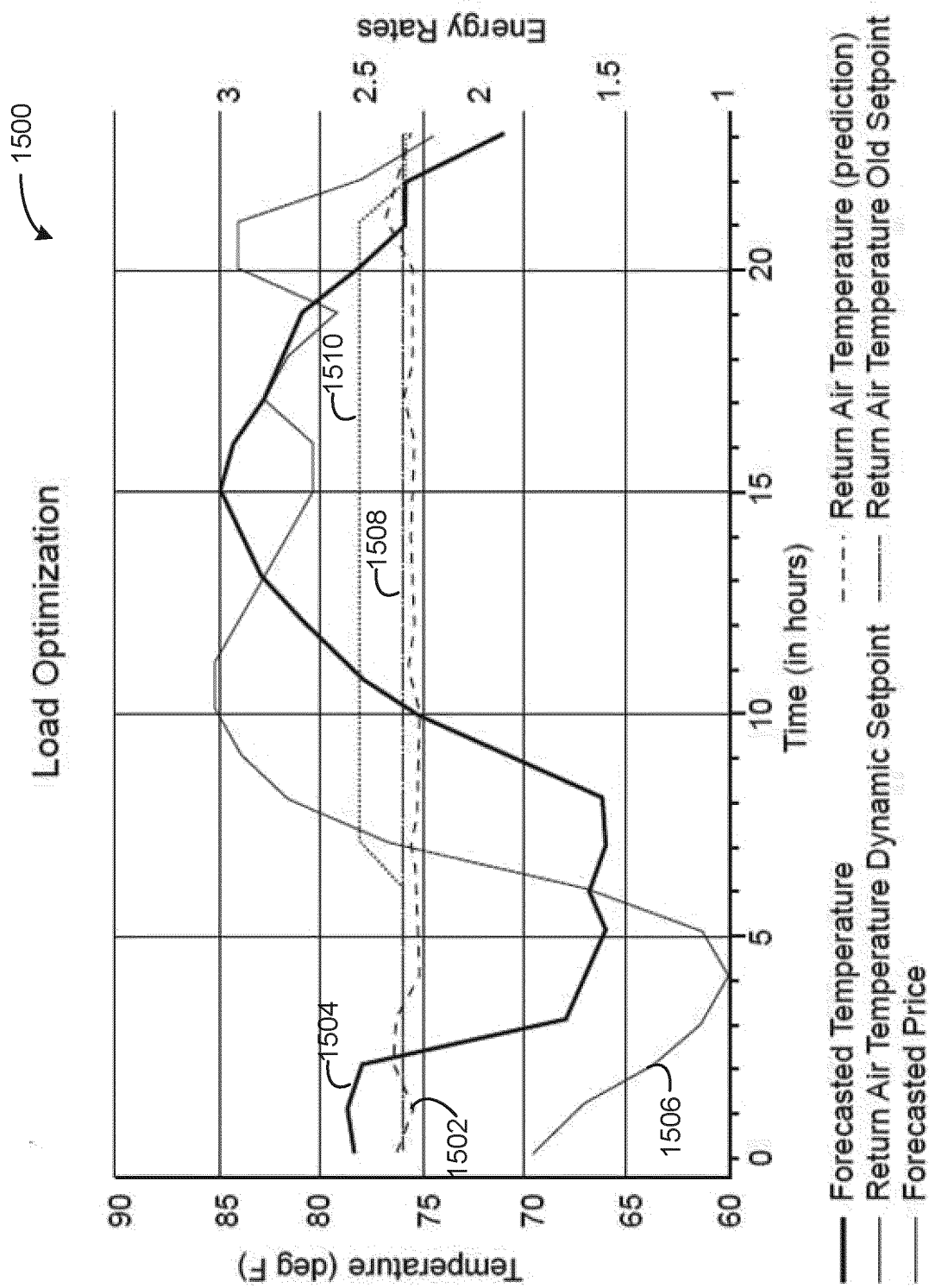
FIG. 15 is a graphical illustration of the parameters used to generate a recommendation for load optimization of an AHU, according to some embodiments.

FIG. 15 is a graph 1500 of the parameters used to generate a recommendation for load optimization of an AHU, according to an exemplary embodiment. In a non-limiting example embodiment, a training model may be created to train a device twin of an AHU to learn the relationship between outside air temperature (OAT) and return air temperature (RAT). In this case, based on hourly forecasted weather data, the RAT can be predicted by the device twin using the training model. In some embodiments, based on the predicted RAT, the cloud platform 502 (e.g., via the analytics manager 1180 or the recommendation generator 1184) can generate a recommendation or operating parameters used to operate the AHU in order to reduce or optimize energy consumption while considering occupant comfort.

For example, referring to FIG. 15, the graph 1500 is shown with various plotted parameters including forecasted AHU load (RAT) 1502, forecasted weather data (e.g., forecasted OAT) 1504, forecasted energy price 1506, old static RAT setpoint 1508, and new dynamic RAT setpoint 1510, which operates between two comfort levels (e.g., 76 degrees Fahrenheit and 78 degrees Fahrenheit) based on energy price, in this example. In this case, the cloud platform 502 may recommend that pre-cooling be performed until 7 AM (e.g., hour 7) to ensure occupancy comfort while the forecasted energy price 1506 is relatively low, and that the dynamic RAT setpoint 1510 be increased to the higher level (e.g., 78 degrees Fahrenheit) after 7 AM while the forecasted energy price 1506 is high. Further, since the forecasted energy price 1506 falls at 11 PM (e.g., hour 23), the cloud platform 502 may recommend that the dynamic RAT setpoint 1510 be kept at the lower level (e.g., 76 degrees Fahrenheit). Based on this RAT setpoint schedule and the forecasted OAT 1504, the digital twin predicts that the forecasted RAT 1502 will be maintained between about 75 degrees Fahrenheit and about 76 degrees Fahrenheit from about 4 AM until about 8 PM. Accordingly, in this way, the cloud platform 502 can generate a recommendation that reduces or optimizes energy consumption while maintaining comfortable RAT levels.

Figure 16:
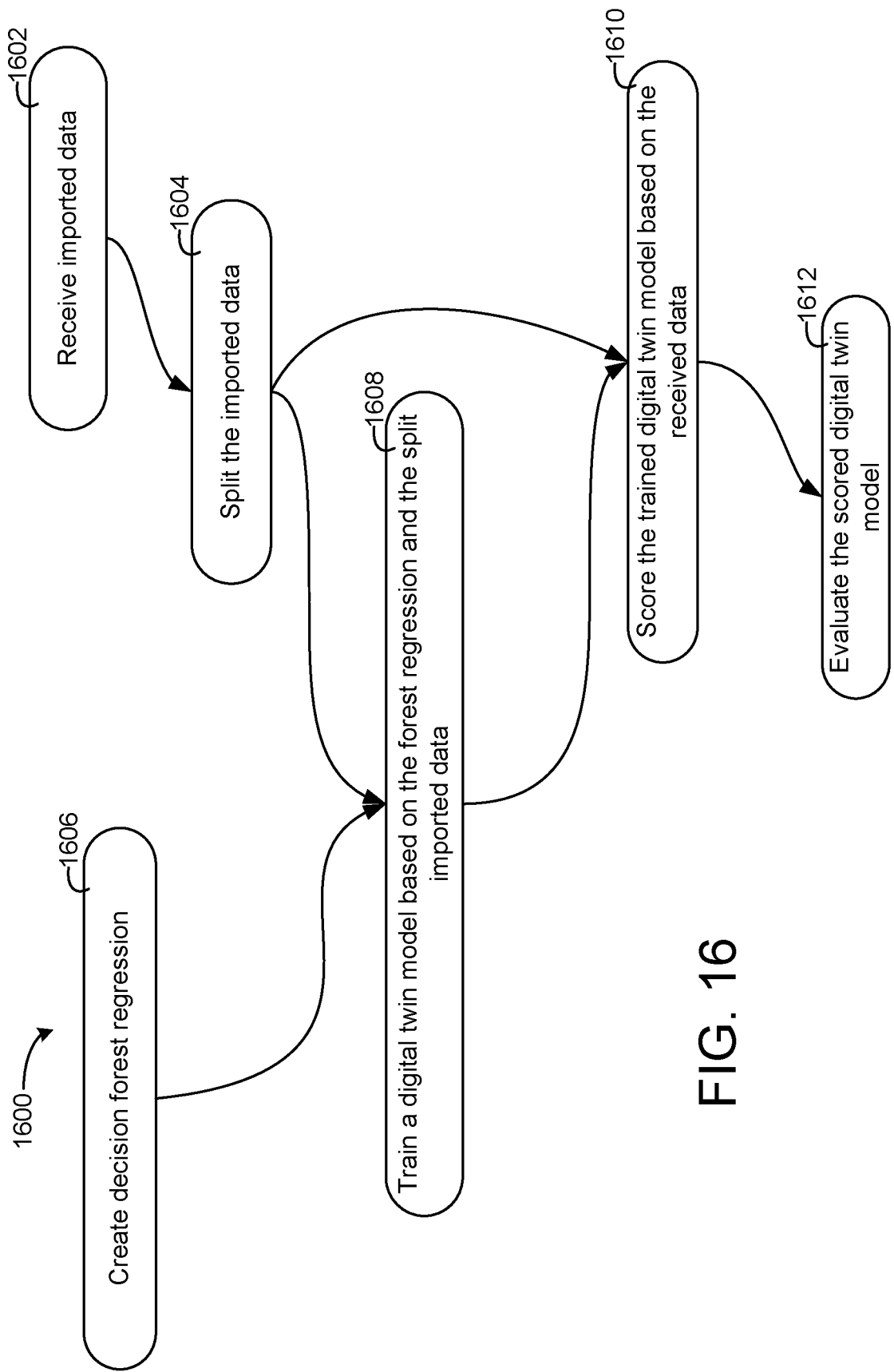
FIG. 16 is a flow diagram for generating a training model to train the device twin of the AHU in FIG. 15.

Turning to FIG. 16, a flow diagram of a process 1600 for generating a training model to train the device twin of the AHU in FIG. 15 is shown, according to an exemplary embodiment. In process 1600, training data is imported by cloud platform 502 at block 1602, and the training data is split into two sets at block 1604, one set used for training and the other set used for scoring. For example, the training data may be split in a 70-30 ratio, but any suitable ratio may be used. In some embodiments the training data may be imported from the cloud database 1142, such as an AZURE SQL database or the like. A non-limiting example snippet of the training data for training the device twin of the AHU to predict the RAT is shown in the following table:

| Hour | OAT | RAT |
|---|---|---|
| 0 | 70.99789 | 75.0817 |
| 0 | 70.06198 | 75.0817 |
| 0 | 70.06198 | 74.88065 |
| 0 | 69.74663 | 75.08407 |
| 1 | 69.44665 | 75.08407 |
| 1 | 69.75398 | 74.88435 |
| 1 | 69.75398 | 75.08625 |
| 1 | 69.75398 | 75.08625 |
| 2 | 69.75398 | 75.08625 |
| 2 | 70.06004 | 75.28568 |
| 2 | 70.35709 | 75.08477 |
| 2 | 71.28342 | 75.08477 |
| 3 | 71.94557 | 75.28423 |
| 3 | 72.57426 | 74.88221 |
| 3 | 73.20401 | 75.08308 |
| 3 | 73.82975 | 75.28539 |
| 4 | 74.80804 | 75.08344 |
| 4 | 75.43638 | 74.8828 |
| 4 | 76.3918 | 75.28764 |
| 4 | 77.006 | 75.08688 |
| 5 | 77.35873 | 75.08688 |
| 5 | 78.0067 | 75.29094 |
| 5 | 78.69695 | 75.29094 |

In some embodiments, a training model may be created at block 1606 using machine learning, such as Microsoft Azure or the like. For example, FIG. 16 shows that the training model may be based on a decision tree forest regression algorithm, but any suitable machine learning algorithms may be used, such as those based on Bayesian Models, Artificial Neural Networks, Deep Artificial Neural Networks, Support Vector Machines (SVMs), Binary Classification Models, Multiclass Classification Models, Regression Models, Decision Tree Models, and/or the like. The training model created at block 1606 and the split imported data at block 1608 is used to train the digital twin of the AHU at block 1608. The trained digital twin is scored at block 1610. For example, the outputs generated by the trained digital twin is compared with the split dataset from block 1604 to generate a score. The score is then evaluated at block 1612 using standard metrics.

Figure 17:
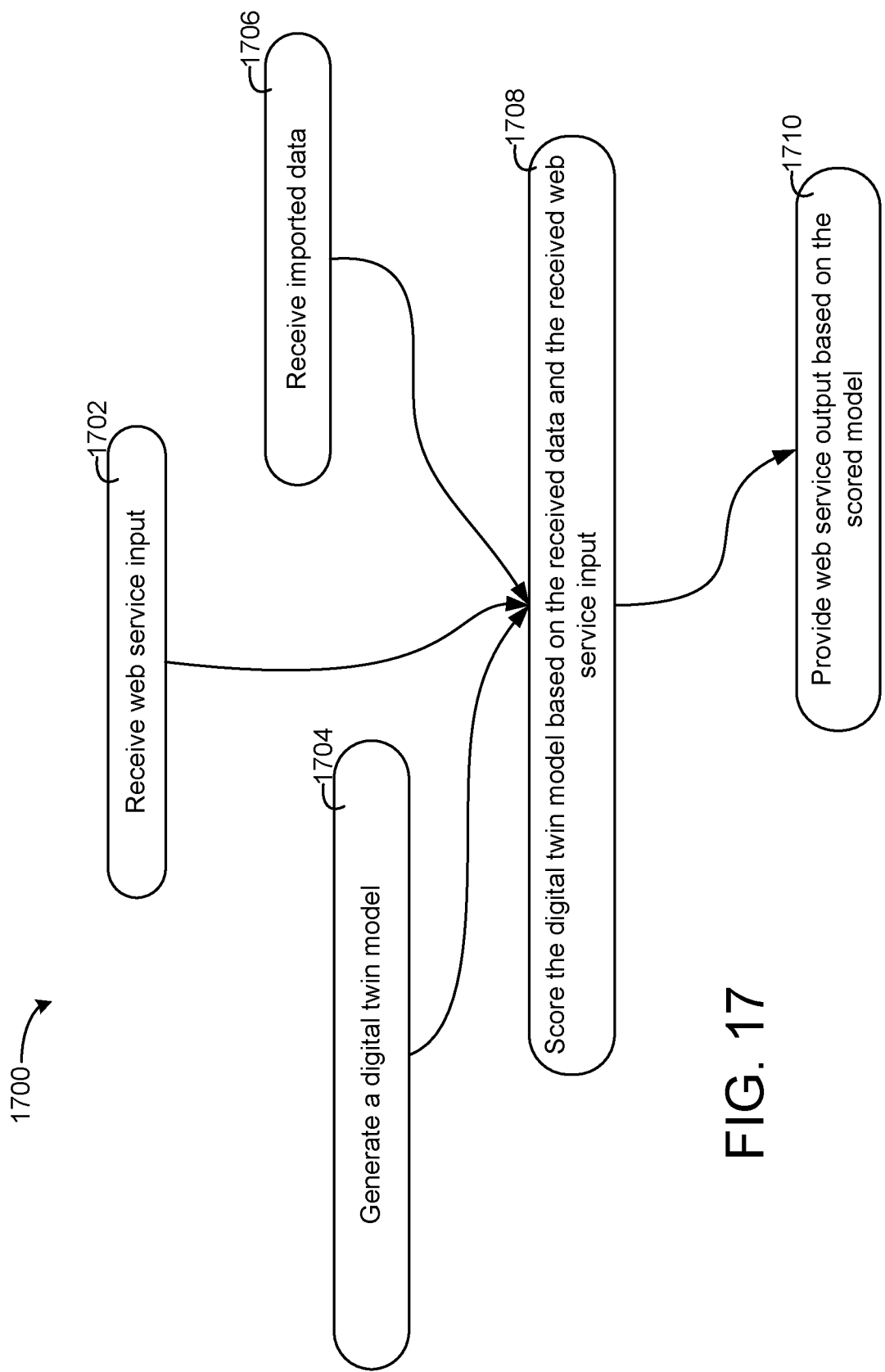
FIG. 17 is a flow diagram for using the training model from FIG. 16 to predict the RAT, according to some embodiments.

Turning now to FIGS. 17, 18A, and 18B, a flow diagram of a process 1700 for using the training model from FIG. 16 to predict the RAT is shown in FIG. 17, according to an exemplary embodiment, FIG. 18A shows an example web service input 1800, and FIG. 18B shows an example web service output 1850. In some embodiments, a web service input 1800 is received by the cloud platform at block 1702. In some embodiments, the web service input 1800 may be provided by the user via the user device or may be provided by other devices in the BMS system (e.g., outdoor temperature sensor, and/or the like) or $3^{rd}$ party providers (e.g., weather forecast service provider, and/or the like). In some embodiments, the web service input 1800 may include input parameters, such as hour (e.g., a time stamp for the prediction), OAT (e.g., current or forecasted outdoor temperature), and RAT (current return air temperature, which may be optional). For example, a sample web service input 1800 is shown in FIG. 18A.

In some embodiments, a trained digital twin model may be generated at block 1704. For example, the trained digital twin model may be generated via the process described with reference to FIG. 16. In some embodiments, training data may be imported at block 1706. In some embodiments the training data may be imported from the cloud database 1142, such as an AZURE SQL database or the like. For example, the training data may be the same as or similar to the training data as described with reference to FIG. 16. In this case, the trained digital twin may predict a RAT for the received web service input parameters based on the training module, and the digital twin may be scored based on the prediction output at block 1708. For example, the cloud platform may compare the prediction output generated by the digital twin with the training data to calculate the score.

In some embodiments, the prediction output is then provided to the web service as a web service output 1850 at block 1710. In some embodiments, the web service output 1850 may be presented to the user via the user device or may be used to generate controls for the associated physical AHU device. In some embodiments, the web service output 1850 may include output parameters, such as hour (e.g., the given hour), OAT (e.g., the given OAT value), RAT (given RAT value, which may be optional), scored label mean (e.g., the predicted RAT value), and scored label standard deviation (e.g., the standard deviation of the predicted RAT value). For example, a sample web service output 1850 is shown in FIG. 18B.

Graphical User Interface

Figures 19, 20, 21:
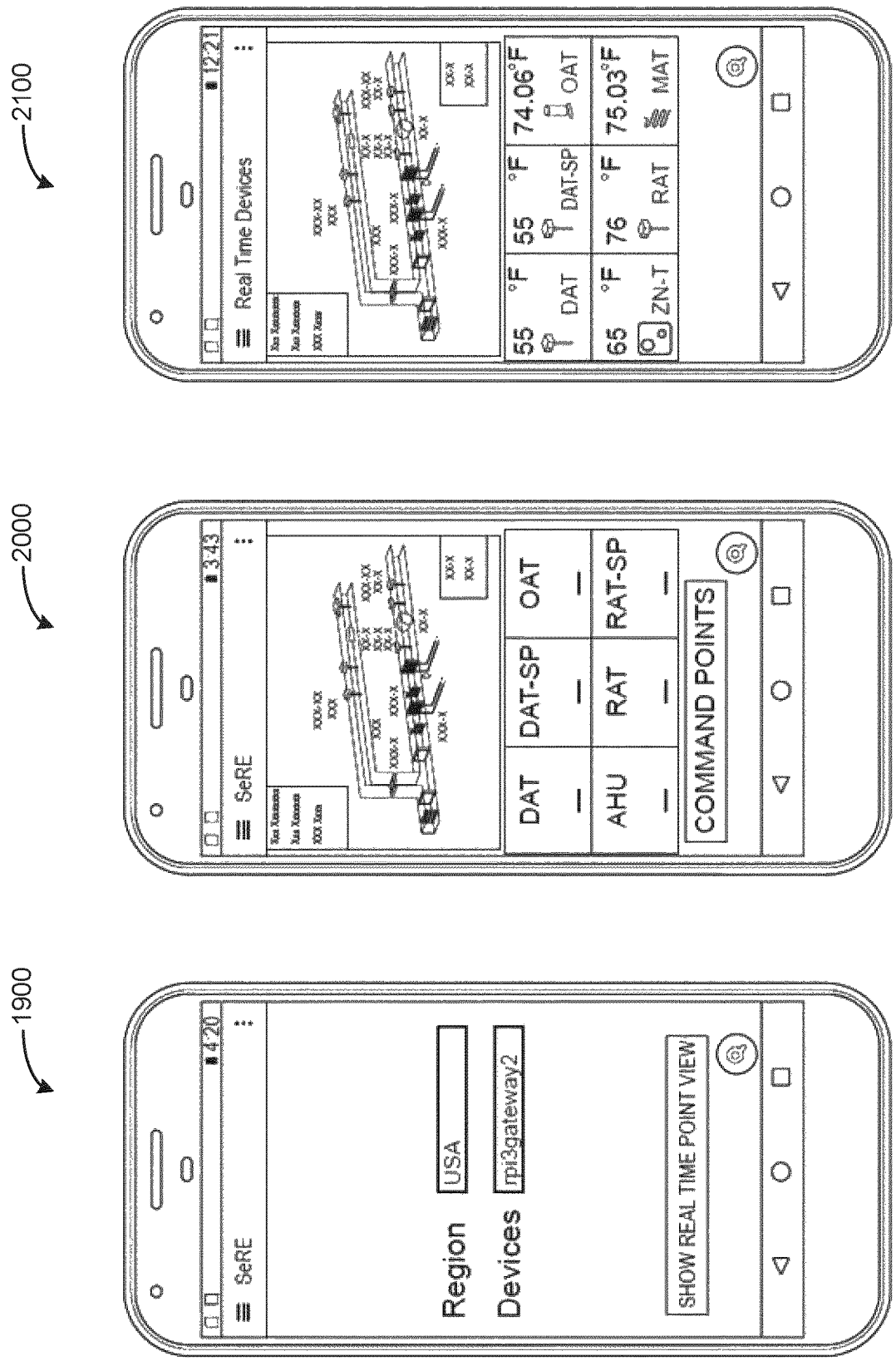
FIGS. 19-25 are example graphical user interfaces generated by the cloud platform, according to various embodiments.
Figure 22:
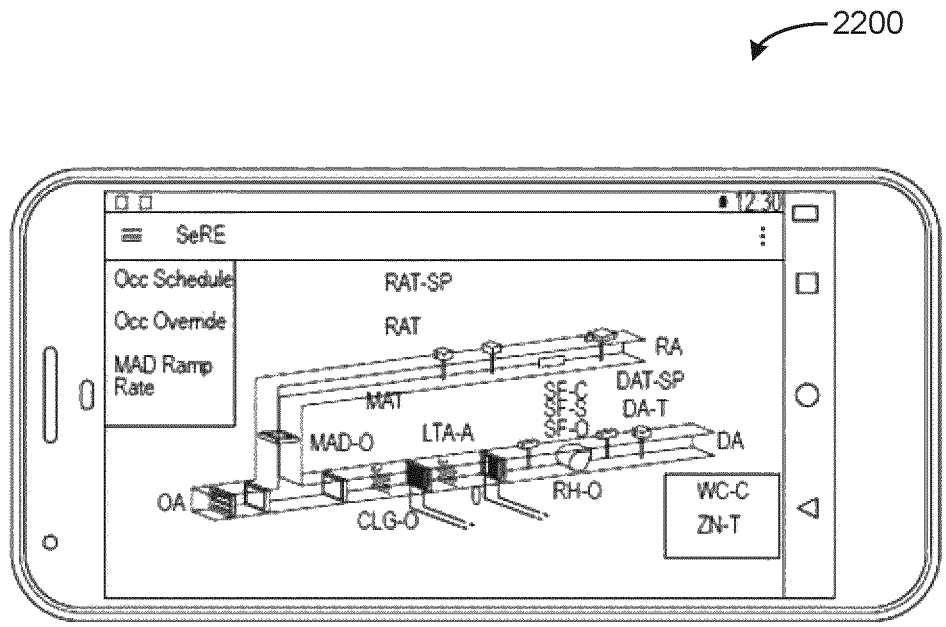
Figure 23:
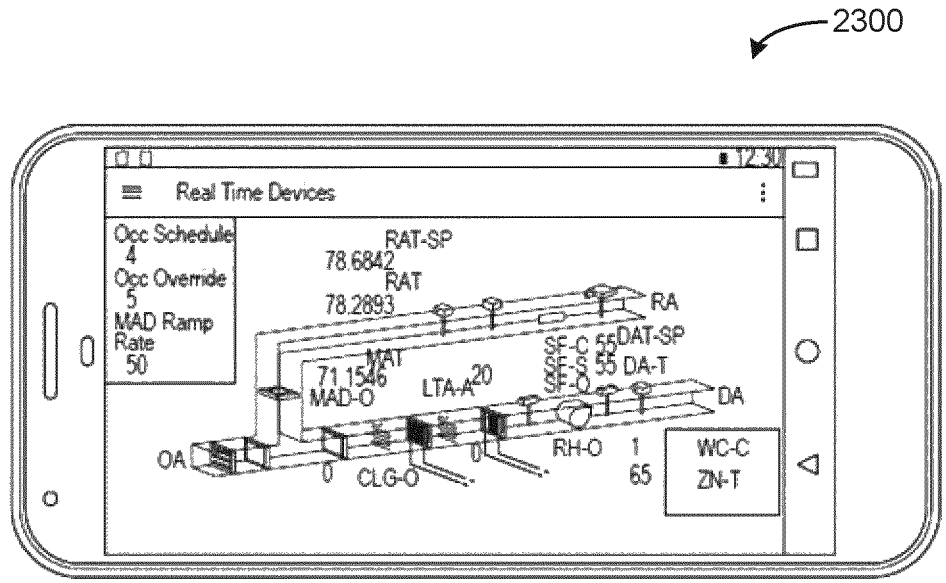
Figure 24:
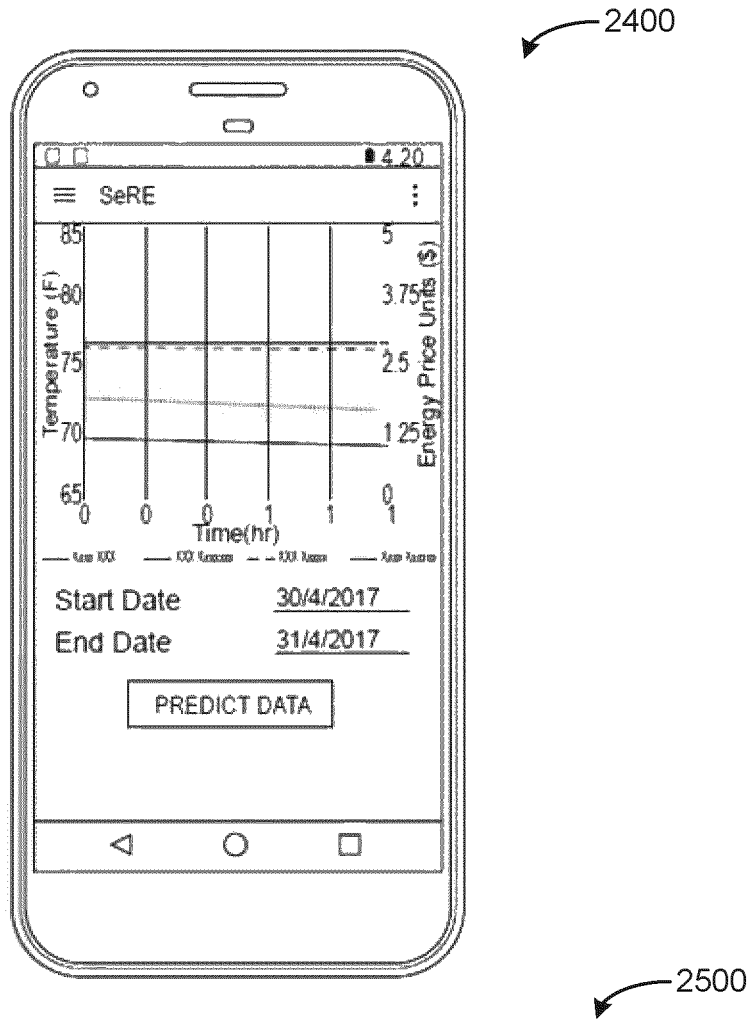
Figure 25:
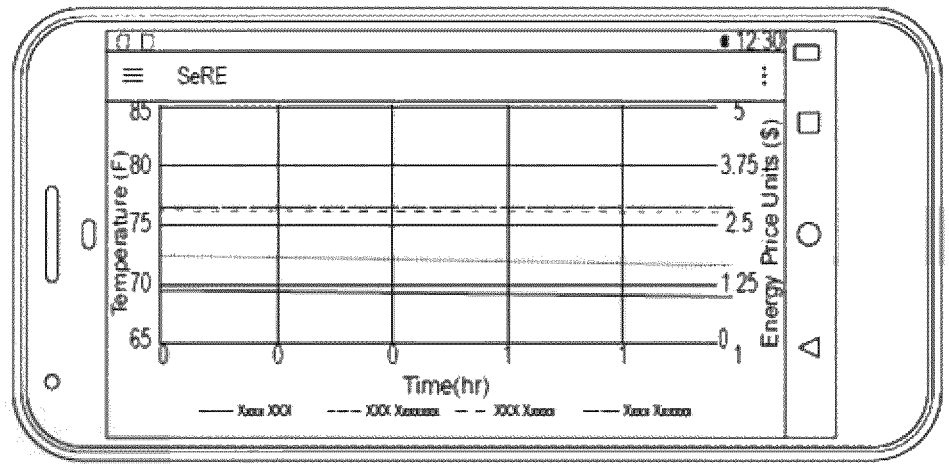

Turning now to FIGS. 19 through 25, example graphical user interfaces generated by the cloud platform is shown, according to various embodiments. FIG. 19 shows a screen shot on a user device of a device selection interface 1900. The user may identify the physical device for which the user would like to view more information from the device selection interface 1900. FIG. 20 shows a screen shot on a user device of a virtual representation 2000 of an HVAC system in a building 10. The virtual representation 2000 includes one or more digital twins for various devices and sensors corresponding to each of a discharge air temperature (DAT), a DAT setpoint (DAT-SP), OAT, AHU, RAT, and a RAT setpoint (RAT-SP). FIG. 21 shows a screen shot on a user device of real-time data points 2100 of the virtual representation 2000. FIG. 21 shows the real-time data received by each of the digital twins for the various devices and sensors in FIG. 20. FIG. 22 shows a landscape view 2200 of the virtual representation 2000 in FIG. 20 and FIG. 23 shows a landscape view 2300 of the data points 2100 of the virtual representation 2000 in FIG. 21. FIG. 24 shows a predicted trend 2400 of environmental outputs generated by the cloud platform. As shown in FIG. 24, in some embodiments, the user may specify a start data and an end date to view the predicted trend corresponding to a specific time period. FIG. 25 shows a landscape view 2500 of the predicted trend 2400 in FIG. 24.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and are considered to be within the scope of the disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor.

When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A building management system (BMS) comprising:
one or more processing circuits configured to:
receive, from a physical building device of a building, environmental inputs and environmental outputs of the physical building device via a communication connection, the communication connection configured based on at least one network configuration parameter;
validate, using data stored by a memory device of the one or more processing circuits, the communication connection;
generate, responsive to validation of the communication connection, a building device digital twin for the physical building device based on the environmental inputs and the environmental outputs, wherein the building device digital twin is a virtual representation of a plurality of components of the physical building device and comprises a model that simulates operation of the physical building device for predicting behavior of the physical building device;
generate a predicted future performance level of the physical building device based on the building device digital twin by executing the model based on the environmental inputs to generate simulated environmental outputs that simulate the operation of the physical building device, wherein the predicted future performance level is based on the simulated environmental outputs and the received environmental outputs;
generate a recommendation based on the predicted future performance level indicating a decrease in a performance level of the physical building device, the recommendation indicating one or more changes to improve the performance level of the physical building device;
generate, using a change of the one or more changes, an update to an operating parameter of the physical building device of the building; and
control an environmental condition of the building by transmitting, via a network, the update to the physical building device.

2. The BMS of claim 1, wherein the one or more processing circuits are configured to:
receive a natural language input from a user of a user device comprising a request for generation of analytics for the physical building device;
perform natural language processing to determine the request for the generation of analytics for the physical building device; and
generate the recommendation in response to determining the request for the generation of analytics.

3. The BMS of claim 1, wherein the one or more processing circuits are configured to:
present, via a user interface of a user device, the recommendation, wherein the recommendation comprises at least one of:
an indication to schedule preventative maintenance for the physical building device;
an indication to adjust the operating parameter of the physical building device; and
an indication of an adjustment to make to a future design of the physical building device.

4. The BMS of claim 1, wherein the one or more processing circuits are configured to:
control, via the physical building device, the environmental condition of the building based on the update.

5. The BMS of claim 4, wherein the one or more processing circuits are configured to:
store initial network configuration parameters associated with the network in a private block chain, the network configured to communicate with the physical building device;
determine current network configuration parameters;
determine whether the network has been compromised by comparing the current network configuration parameters to the initial network configuration parameters, wherein a match between the current network configuration parameters and the initial network configuration parameters indicates that the network has not been compromised; and
transmit the update to the physical building device in response to a determination that the network has not been compromised.

6. The BMS of claim 1, wherein the one or more processing circuits are configured to generate the building device digital twin for the physical building device based on the received environmental inputs and the received environmental outputs by:
generating a decision forest regression model;
generating a training data set and a scoring data set by dividing the environmental inputs and the environmental outputs into the training data set and the scoring data set;
training the decision forest regression model based on the training data set, wherein the decision forest regression model is the building device digital twin; and
generating a performance metric for the decision forest regression model by evaluating the decision forest regression model based on the scoring data set.

7. The BMS of claim 1, wherein the one or more processing circuits are configured to generate the predicted future performance level of the physical building device based on the building device digital twin by:
receiving current environmental inputs from the physical building device, wherein the current environmental inputs are recorded by the physical building device after the environmental inputs; and
generating the simulated environmental outputs based on the building device digital twin and the current environmental inputs.

8. The BMS of claim 1, wherein the one or more processing circuits are configured to:
receive real-time environmental inputs from the physical building device;
generate a three dimensional view of the building and the physical building device; and
present, via a user interface of a user device, the three dimensional view of the building and the physical building device, and an indication of the received real-time environmental inputs.

9. A method comprising:
receiving, from a physical building device of a building, environmental inputs and environmental outputs of the physical building device via a communication connection, the communication connection configured based on at least one network configuration parameter;
validating, using data stored by a memory device of one or more processing circuits, the communication connection;
generating, responsive to validation of the communication connection, a building device digital twin for the physical building device based on the received environmental inputs and the received environmental outputs, wherein the building device digital twin is a virtual representation of a plurality of components of the physical building device and comprises a model that simulates operation of the physical building device for predicting behavior of the physical building device;
generating a predicted future performance level of the physical building device based on the building device digital twin by executing the model based on the received environmental inputs to generate simulated environmental outputs that simulate the operation of the physical building device, wherein the predicted future performance level is based on the simulated environmental outputs and the received environmental outputs;
generating a recommendation based on the predicted future performance level indicating a decrease in a performance level of the physical building device, the recommendation indicating one or more changes to improve the performance level of the physical building device;
generating, using a change of the one or more changes, an update to an operating parameter of the physical building device of the building; and
controlling an environmental condition of the building by transmitting, via a network, the update to the physical building device.

10. The method of claim 9, further comprising:
receiving a natural language input from a user of a user device comprising a request for generation of analytics for the physical building device;
performing natural language processing to determine the request for the generation of analytics for the physical building device; and
generating the recommendation in response to determining the request for the generation of analytics.

11. The method of claim 9, further comprising:
presenting, via a user interface of a user device, the recommendation, wherein the recommendation comprises at least one of:
an indication to schedule preventative maintenance for the physical building device;
an indication to adjust the operating parameter of the physical building device; and
an indication of an adjustment to make to a future design of the physical building device.

12. The method of claim 9, further comprising:
controlling, via the physical building device, the environmental condition of the building based on the update.

13. The method of claim 12, further comprising:
storing initial network configuration parameters associated with the network in a private block chain, the network configured to communicate with the physical building device;
determining current network configuration parameters;
determining whether the network has been compromised by comparing the current network configuration parameters to the initial network configuration parameters, wherein a match between the current network configuration parameters and the initial network configuration parameters indicates that the network has not been compromised; and
transmitting the update to the physical building device in response to a determination that the network has not been compromised.

14. The method of claim 9, wherein generating the building device digital twin for the physical building device based on the received environmental inputs and the received environmental outputs further comprises:
generating a decision forest regression model;
generating a training data set and a scoring data set by dividing the environmental inputs and the environmental outputs into the training data set and the scoring data set;
training the decision forest regression model based on the training data set, wherein the decision forest regression model is the building device digital twin; and
generating a performance metric for the decision forest regression model by evaluating the decision forest regression model based on the scoring data set.

15. The method of claim 9, wherein generating the predicted future performance level of the physical building device based on the building device digital twin further comprises:
receiving current environmental inputs from the physical building device, wherein the current environmental inputs are recorded by the physical building device after the environmental inputs; and
generating the simulated environmental outputs based on the building device digital twin and the current environmental inputs.

16. The method of claim 9, further comprising:
receiving real-time environmental inputs from the physical building device;
generating a three dimensional view of the building and the physical building device; and
presenting, via a user interface of a user device, the three dimensional view of the building and the physical building device, and an indication of the received real-time environmental inputs.

17. A building management system (BMS) comprising:
one or more processing circuits configured to:
- receive, from a physical building device of a building, environmental inputs and environmental outputs of the physical building device via a communication connection, the communication connection configured based on at least one network configuration parameter;
- generate, responsive to a validation of the communication connection, a building device digital twin for the physical building device based on the environmental inputs and the environmental outputs, wherein the building device digital twin is a virtual representation of a plurality of components of the physical building device and comprises a model that simulates operation of the physical building device for predicting behavior of the physical building device;
- generate a predicted future performance level of the physical building device based on the building device digital twin by executing the model based on the environmental inputs to generate simulated environmental outputs that simulate the operation of the physical building device, wherein the predicted future performance level is based on the simulated environmental outputs and the received environmental outputs;
- generate a recommendation based on the predicted future performance level indicating a decrease in a performance level of the physical building device, the recommendation indicating one or more changes to improve the performance level of the physical building device;
- generate, using a change of the one or more changes, an update to an operating parameter of the physical building device of the building; and
- transmit the update to the physical building device by storing the update in a blockchain, wherein the physical building device retrieves the update from the blockchain and controls an environmental condition of the building using the update stored in the blockchain.

18. The BMS of claim 17, wherein the update improves the performance level of the physical building device.

19. A building management system (BMS) comprising:
one or more processing circuits configured to:
- receive, from a physical building device of a building, environmental inputs and environmental outputs of the physical building device via a communication connection, the communication connection configured based on at least one network configuration parameter;
- validate, using data stored in a blockchain, the communication connection;
- generate, responsive to validation of the communication connection, a building device digital twin for the physical building device based on the environmental inputs and the environmental outputs, wherein the building device digital twin is a virtual representation of a plurality of components of the physical building device and comprises a model that simulates operation of the physical building device for predicting behavior of the physical building device;
- generate a predicted future performance level of the physical building device based on the building device digital twin by executing the model based on the environmental inputs to generate simulated environmental outputs that simulate the operation of the physical building device, wherein the predicted future performance level is based on the simulated environmental outputs and the received environmental outputs;
- generate a recommendation based on the predicted future performance level indicating a decrease in a performance level of the physical building device, the recommendation indicating one or more changes to improve the performance level of the physical building device; and
- transmit an update to the physical building device by storing the update in the blockchain, wherein the physical building device retrieves the update from the blockchain and controls an environmental condition of the building using the update stored in the blockchain.

20. The BMS of claim 19, wherein the one or more processing circuits are configured to:
- update the blockchain by adding a block to the blockchain, the block comprising at least one of the simulated environmental outputs or the recommendation.

* * * * *